US007241728B2

(12) United States Patent
Radomyselski et al.

(10) Patent No.: US 7,241,728 B2
(45) Date of Patent: *Jul. 10, 2007

(54) PROCESS FOR PURIFYING A CONTAMINANT-CONTAINING LIPOPHILIC FLUID

(75) Inventors: Arseni Valerevich Radomyselski, Hamilton, OH (US); Paul Amaat Raymond Gerald France, West Chester, OH (US); Dewey Edward Burton, Fairfield, OH (US); Michael Jason Ullom, Mason, OH (US); Marcus Anthony Bertin, Cincinnati, OH (US); Scott Edward Powell, Loveland, OH (US); Eddy Vos, Koetsiersweg (BE); Veerle Maria Nathalie Lootvoet, Ghent (BE); William Michael Scheper, Lawrenceburg, IN (US); John Christian Haught, West Chester, OH (US); John Christopher Deak, Clarks Summit, PA (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,849

(22) Filed: Jun. 14, 2006

(65) Prior Publication Data
US 2006/0234892 A1  Oct. 19, 2006

Related U.S. Application Data

(63) Continuation of application No. 10/238,293, filed on Sep. 10, 2002, now Pat. No. 7,084,099.

(60) Provisional application No. 60/318,648, filed on Sep. 10, 2001, provisional application No. 60/318,439, filed on Sep. 10, 2001, provisional application No. 60/318,396, filed on Sep. 10, 2001, provisional application No. 60/318,393, filed on Sep. 10, 2001, provisional application No. 60/318,381, filed on Sep. 10, 2001.

(51) Int. Cl.
C11D 3/44 (2006.01)
B01D 15/00 (2006.01)
(52) U.S. Cl. ............... 510/285; 510/407; 210/502.1; 210/660; 210/689; 210/690; 134/10; 8/142
(58) Field of Classification Search ............. 510/285, 510/407; 210/502.1, 660, 689, 690; 134/10; 8/142
See application file for complete search history.

(56) References Cited

U.S. PATENT DOCUMENTS

| 3,395,086 A | 7/1968 | Victor et al. |
|---|---|---|
| 3,441,501 A | 4/1969 | Segall et al. |
| 3,692,467 A | 9/1972 | Durr et al. |
| 3,733,267 A | 5/1973 | Haase et al. |
| 3,839,176 A | 10/1974 | McCoy et al. |
| 3,955,946 A * | 5/1976 | Fuhring et al. ............... 96/133 |
| 4,108,599 A | 8/1978 | Coll-Palagos et al. |
| 4,309,247 A | 1/1982 | Hou et al. |
| 4,584,092 A | 4/1986 | Kanematu et al. |
| 4,604,205 A | 8/1986 | Ayers et al. |
| 4,664,754 A | 5/1987 | Caputi et al. |
| 4,747,960 A | 5/1988 | Freeman et al. |
| 5,882,506 A | 3/1999 | Ohsol et al. |
| 6,042,618 A | 3/2000 | Berndt et al. |
| 6,059,845 A | 5/2000 | Berndt et al. |
| 6,086,635 A | 7/2000 | Berndt et al. |
| 6,312,476 B1 * | 11/2001 | Perry et al. ................... 8/142 |
| 6,368,359 B1 | 4/2002 | Perry et al. |
| 6,691,536 B2 | 2/2004 | Severns et al. |
| 6,855,173 B2 * | 2/2005 | Ehrnsperger et al. .......... 8/142 |
| 6,914,040 B2 * | 7/2005 | Deak et al. .................. 510/285 |
| 6,930,079 B2 * | 8/2005 | Deak et al. .................. 510/285 |
| 6,998,377 B2 * | 2/2006 | Deak et al. .................. 510/285 |
| 2001/0004062 A1 | 6/2001 | Rutledge et al. |
| 2002/0000009 A1 * | 1/2002 | Perry ........................... 8/142 |
| 2002/0017493 A1 | 2/2002 | Ehrnsperger et al. |
| 2002/0038480 A1 | 4/2002 | Deak et al. |
| 2002/0184715 A1 | 12/2002 | Taylor et al. |

FOREIGN PATENT DOCUMENTS

| DE | 3739711 | | 6/1989 |
|---|---|---|---|
| DE | 299 21 805 U1 | | 6/2000 |
| EP | 0 669 152 A1 | | 8/1995 |
| EP | 0841362 | | 5/1998 |
| GB | 807200 | | 1/1959 |
| GB | 996578 | * | 6/1965 |
| JP | 58023964 A | | 2/1983 |
| JP | 61-084995 | | 5/1986 |
| WO | WO 01/06051 A1 | | 1/2001 |

(Continued)

Primary Examiner—Lorna M. Douyon
(74) Attorney, Agent, or Firm—Kim William Zerby; Steven W. Miller

(57) ABSTRACT

The present invention relates to a system for processing a lipophilic fluid, more particularly to a system for processing a lipophilic fluid utilized in a fabric treating process, even more particularly to a system for processing a lipophilic fluid such that contaminants such as water, surfactants, water, body/food oils, fatty acids, and dyes can be removed from the lipophilic fluid. In other words, the present invention relates to the "cleaning up" of or purification of a lipophilic fluid such that it can be re-used in a lipophilic fluid system.

4 Claims, 4 Drawing Sheets

FOREIGN PATENT DOCUMENTS

| WO | WO 01/27380 A1 | 4/2001 |
| WO | WO 01/34613 A1 | 5/2001 |
| WO | WO 01/44256 A1 | 6/2001 |
| WO | WO 01/93977 A2 | 12/2001 |
| WO | WO 01/94679 A2 | 12/2001 |
| WO | WO 02/077356 A1 | 10/2002 |

* cited by examiner

PROCESS FOR PURIFYING A CONTAMINANT-CONTAINING LIPOPHILIC FLUID

RELATED APPLICATIONS

This application is a Continuation application of U.S. application Ser. No. 10/238,293, filed Sep. 10, 2002 now U.S. Pat. No. 7,084,099, which claims priority to U.S. Provisional Application Nos. 60/318,393, 60/318,439, 60/318/648, 60/318,381 and 60/318,396 all filed on Sep. 10, 2001.

FIELD OF THE INVENTION

The present invention relates to a system for processing a lipophilic fluid, more particularly to a system for processing a lipophilic fluid utilized in a fabric treating process, even more particularly to a system for processing a lipophilic fluid such that contaminants such as water, surfactants, water, body/food oils, fatty acids, and dyes can be removed from the lipophilic fluid. In other words, the present invention relates to the "cleaning up" of or purification of a lipophilic fluid such that it can be re-used in a lipophilic fluid system.

BACKGROUND OF THE INVENTION

In dry cleaning, dry cleaning solvent is commonly purified using distillation. Distillation equipment is expensive, energy consuming, and can provide safety hazards when used with flammable solvents.

Accordingly, there is a need for a non-distillation type of solvent purification system.

SUMMARY OF THE INVENTION

The present invention fulfills the need described above by providing a system for processing a lipophilic fluid that avoids the problems associated with distillation. More particularly, the present invention provides a non-distillation solvent purification process.

In one embodiment, the non-distillation solvent purification process utilizes a multi-step (i.e., two or more steps) process. The process does not require vacuum and high temperatures. Each process step designed to remove a specific group of solvent contaminants that are common in dry cleaning solvents. Such contaminants may include surfactants, water, body/food oils, fatty acids, and dyes.

In one aspect of the present invention, a system for processing a contaminant-containing lipophilic fluid comprising the steps of:
a. contacting a water absorbing agent with the lipophilic fluid; and
b. contacting an adsorbent agent selected from the group consisting of: polar agents, apolar agents, charged agents and mixtures thereof with the lipophilic fluid; and
c. optionally, condensing and/or coalescing the filtrate produced by each step to produce a condensate comprising water and the lipophilic fluid; and
d. optionally, separating the lipophilic fluid and water of the condensate; and
e. optionally, collecting the water; and
f. optionally, using the lipophilic fluid for a lipophilic fluid process, is provided.

In another aspect of the present invention, a system for processing a lipophilic fluid comprising the steps of:
a. contacting a porous agent with the lipophilic fluid; and
b. contacting an adsorbent agent selected from the group consisting of: polar agents, apolar agents, charged agents and mixtures thereof with the lipophilic fluid; and
c. optionally, condensing and/or coalescing the filtrate produced by each step to produce a condensate comprising water and the lipophilic fluid; and
d. optionally, separating the water of the condensate from the lipophilic fluid of the condensate; and
e. optionally, collecting the water; and
f. optionally, using the lipophilic fluid for a lipophilic fluid process, is provided.

In yet another aspect of the present invention, a system for processing a lipophilic fluid comprising the steps of:
a. contacting a porous agent with the lipophilic fluid;
b. contacting a water absorbing agent with the lipophilic fluid; and
c. contacting an adsorbent agent selected from the group consisting of: polar agents, apolar agents, charged agents and mixtures thereof with the lipophilic fluid
d. optionally, condensing and/or coalescing the filtrate produced by each step to produce a condensate comprising water and the lipophilic fluid; and
e. optionally, separating the water of the condensate from the lipophilic fluid of the condensate; and
f. optionally, collecting the water; and
g. optionally, using the lipophilic fluid for a lipophilic fluid process, is provided.

In even yet another aspect of the present invention, a system for processing a surfactant-containing lipophilic fluid comprising the steps of:
a. contacting an adsorbent material comprising a charged agent with the lipophilic fluid to produce; and
b. optionally, contacting an adsorbent material comprising a polar agent and/or apolar agent; and
c. optionally, contacting a water absorbing agent; and
d. optionally, contacting a porous agent, is provided.

In still another aspect of the present invention, a combined condenser/coalescer suitable for use in the processes of the present invention, comprising a condenser component and a coalescer component, is provided.

In even still another aspect of the present invention, a process for removing a contaminant from a lipophilic fluid comprising the step of adding an aqueous solution of a hydrotrope to the lipophilic fluid such that the contaminant present in the lipophilic fluid is extracted from the lipophilic fluid to the aqueous solution of the hydrotrope to form a contaminant-containing aqueous solution and lipophilic fluid mixture is provided.

The systems and processes of the present invention may also include recovering any eluents produced by the processes (i.e., lipophilic fluid that is substantially free of surfactants and/or water and/or other contaminants).

The systems and processes of the present invention may be incorporated into fabric article treating apparatuses suitable for in-home use, not just commercial fabric article treating use. In other words, the systems and processes may be used by a consumer in a consumer's home, especially wherein the fabric article treating machine (i.e., laundry machine) and the cleaning composition are designed to be interdependent so as to maximize the fabric article treating system.

DETAILED DESCRIPTION OF THE INVENTION

Definitions

Figure 1:
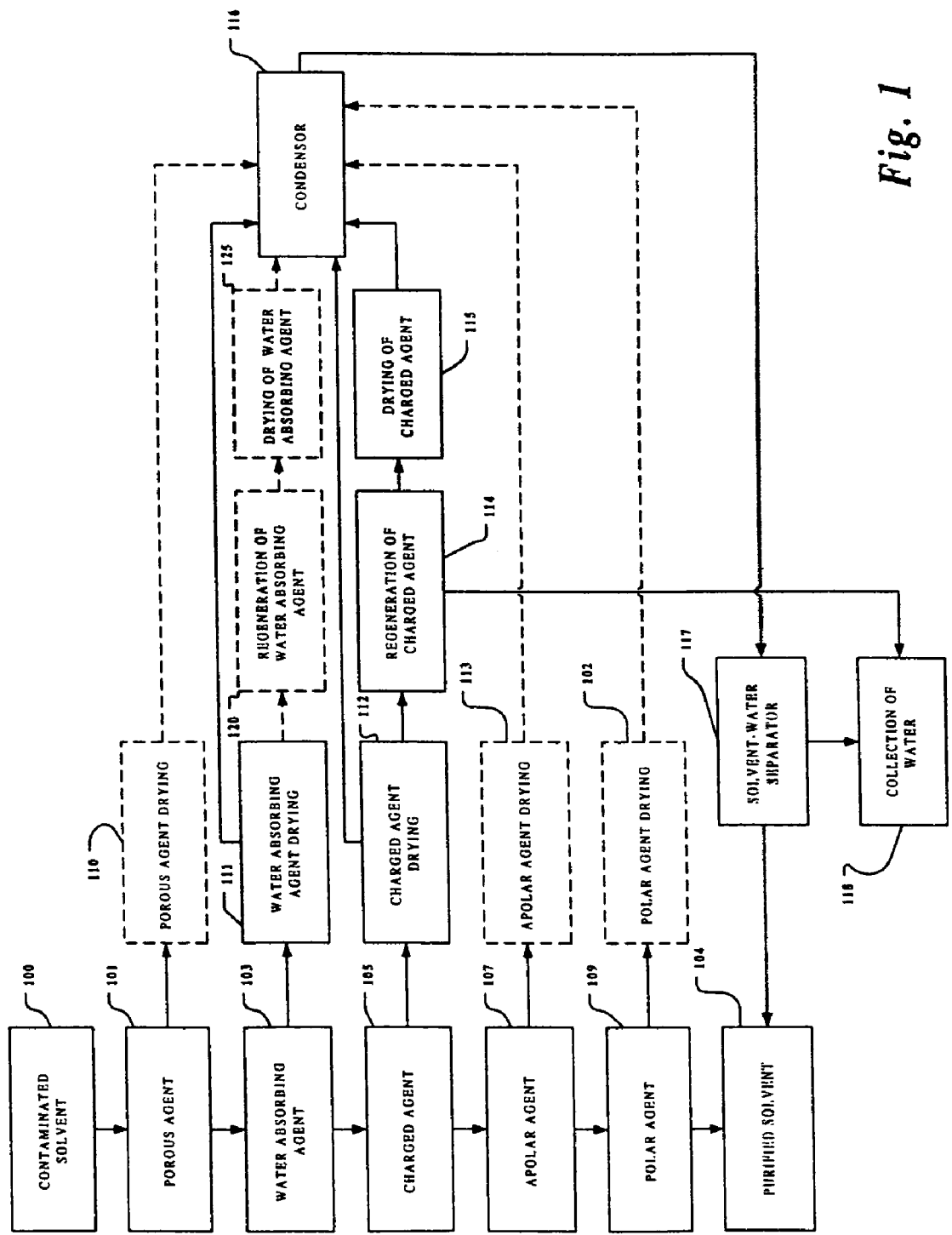
FIG. 1 is a schematic flow-chart representation of a system for processing a lipophilic fluid in accordance with the present invention.

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "absorbent material" or "absorbent polymer" used herein is intended to mean any material capable of selectively absorbing or adsorbing water and/or water-containing liquids without absorbing lipophilic fluids as described in detail. In other words, absorbent materials or absorbent polymers comprise a water absorbing agent. In the art they may also be referred to as "responsive gels," "gel," and "polymeric gel." For a list of phase changing gels, see the textbook *Responsive Gels, Volume Transitions II*, Ed K. Dusek, Springer Verlag Berlin, 1993 (herein incorporated by reference). See also, *Thermo-responsive Gels*, Radiat. Phys. Chem., Volume 46, No. 2, pp.185-190, Elsevier Science Ltd. Great Britain, 1995 (herein incorporated by reference). Super absorbent polymers, also suitable for use with the present invention, are polymeric materials that have an absorption capacity at or above 5 grams/gram. See also, *Superabsorbent Polymers Science and Technology*, edited by Fredric L. Buchholz and Nicholas A. Peppas, American Chemical Society, Washington DC, 1994 (particularly Chapter 9 by Tadao Shimomura and Takashi Namba entitled "Preparation and Application of High-Performance Superabsorbent Polymers) herein incorporated by reference.

The term "absorbent matrix permeability aid" or "spacer material" or "spacer" used herein is intended to mean any fibrous or particulate material that is, at most, only slightly soluble in water and/or lipophilic fluid.

The term "absorbent matrix" used herein is intended to mean a matrix in any form that is capable of absorbing or adsorbing water. At minimum, it comprises an absorbent material. It may optionally comprise a spacer material and/or a high surface area material.

The term "lipophilic fluid" used herein is intended to mean any nonaqueous fluid capable of removing sebum, as described in more detail herein below.

The term "cleaning composition" and/or "treating composition" as used herein are intended to mean any lipophilic fluid-containing composition that comes into direct contact with fabric articles to be cleaned. It should be understood that the term encompasses uses other than cleaning, such as conditioning and sizing. Furthermore, optional cleaning adjuncts such as additional contaminants other than those contaminants described above, bleaches, and the like may be added to the "cleaning composition". That is, cleaning adjuncts/additives may be optionally combined with the lipophilic fluid. These optional cleaning adjuncts are described in more detail herein below. Such cleaning adjuncts may be present in the cleaning compositions of the present invention at a level of from 0.01% to about 10% by weight of the cleaning composition. The additives are selected from those materials that can provide cleaning benefits in the lipophilic fluid. Such additives may include those used in current products for aqueous washing (surfactants, brighteners, perfumes, enzymes, solvents, dyes, etc.) as well as other materials that are soluble or can be suspended in the lipophilic fluid.

The term "soil" means any undesirable substance on a fabric article that is desired to be removed. By the terms "water-based" or "hydrophilic" soils, it is meant that the soil comprised water at the time it first came in contact with the fabric article, or the soil retains a significant portion of water on the fabric article. Examples of water-based soils include, but are not limited to beverages, many food soils, water soluble dyes, bodily fluids such as sweat, urine or blood, outdoor soils such as grass stains and mud.

The term "capable of suspending water in a lipophilic fluid" means that a material is able to suspend, solvate or emulsify water, which is immiscible with the lipophilic fluid, in a way that the water remains visibly suspended, solvated or emulsified when left undisturbed for a period of at least five minutes after initial mixing of the components. In some examples of compositions in accordance with the present invention, the compositions may be colloidal in nature and/or appear milky. In other examples of compositions in accordance with the present invention, the compositions may be transparent.

The term "insoluble in a lipohilic fluid" means that when added to a lipophilic fluid, a material physically separates from the lipophilic fluid (i.e. settle-out, flocculate, float) within 5 minutes after addition, whereas a material that is "soluble in a lipophilic fluid" does not physically separate from the lipophilic fluid within 5 minutes after addition.

The term "consumable detergent composition" means any composition, that when combined with a lipophilic fluid, results in a cleaning composition according to the present invention.

The term "processing aid" refers to any material that renders the consumable detergent composition more suitable for formulation, stability, and/or dilution with a lipophilic fluid to form a cleaning composition in accordance with the present invention.

The term "mixing" as used herein means combining two or more materials (i.e., fluids, more specifically a lipophilic fluid and a consumable detergent composition) in such a way that a homogeneous mixture is formed. Suitable mixing processes are known in the art. Nonlimiting examples of suitable mixing processes include vortex mixing processes and static mixing processes.

Lipophilic Fluid

The lipophilic fluid herein is one having a liquid phase present under operating conditions of a fabric/leather article treating appliance, in other words, during treatment of a fabric article in accordance with the present invention. In general such a lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the lipophilic fluid is not a compressible gas such as carbon dioxide.

It is preferred that the lipophilic fluids herein be nonflammable or have relatively high flash points and/or low VOC (volatile organic compound) characteristics, these terms having their conventional meanings as used in the dry cleaning industry, to equal or, preferably, exceed the characteristics of known conventional dry cleaning fluids.

Moreover, suitable lipophilic fluids herein are readily flowable and nonviscous.

In general, lipophilic fluids herein are required to be fluids capable of at least partially dissolving sebum or body soil as defined in the test hereinafter. Mixtures of lipophilic fluid are also suitable, and provided that the requirements of the Lipophilic Fluid Test, as described below, are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic fluid-containing composition.

Other suitable lipophilic fluids include, but are not limited to, diol solvent systems e.g., higher diols such as C6- or C8- or higher diols, organosilicone solvents including both cyclic and acyclic types, and the like, and mixtures thereof.

A preferred group of nonaqueous lipophilic fluids suitable for incorporation as a major component of the compositions of the present invention include low-volatility nonfluorinated organics, silicones, especially those other than amino functional silicones, and mixtures thereof. Low volatility nonfluorinated organics include for example OLEAN® and other polyol esters, or certain relatively nonvolatile biodegradable mid-chain branched petroleum fractions.

Another preferred group of nonaqueous lipophilic fluids suitable for incorporation as a major component of the compositions of the present invention include, but are not limited to, glycol ethers, for example propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether. Suitable silicones for use as a major component, e.g., more than 50%, of the composition include cyclopentasiloxanes, sometimes termed "D5", and/or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable lipophilic fluids are commercially available from Procter & Gamble or from Dow Chemical and other suppliers.

Qualification of Lipophilic Fluid and Lipophilic Fluid Test (LF Test)

Any nonaqueous fluid that is both capable of meeting known requirements for a dry-cleaning fluid (e.g. flash point etc.) and is capable of at least partially dissolving sebum, as indicated by the test method described below, is suitable as a lipophilic fluid herein. As a general guideline, perfluorobutylamine (Fluorinert FC-43®) on its own (with or without adjuncts) is a reference material which by definition is unsuitable as a lipophilic fluid for use herein (it is essentially a nonsolvent) while cyclopentasiloxanes have suitable sebum-dissolving properties and dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials, each vial will contain one type of lipophilic soil. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a clear single phase is formed in any of the vials containing lipophilic soils, then the nonaqueous fluid qualifies as suitable for use as a "lipophilic fluid" in accordance with the present invention. However, if two or more separate layers are formed in all three vials, then the amount of nonaqueous fluid dissolved in the oil phase will need to be further determined before rejecting or accepting the nonaqueous fluid as qualified.

In such a case, with a syringe, carefully extract a 200-microliter sample from each layer in each vial. The syringe-extracted layer samples are placed in GC auto sampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass). A suitable GC is a Hewlett Packard Gas Chromatograph BP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow @ ~1.5 ml/min.
  Split Vent @ ~250-500 ml/min.
  Septum Purge @ 1 ml/min.
Injection: HP 7673 Autosampler, 10 ul syringe, 1 ul injection
Injector Temperature: 350° C.
Detector Temperature: 380° C.
Oven Temperature Program: initial 60° C. hold 1 min.
  rate 25° C./min.
  final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage and/or fabric puckering profile and do not appreciably damage plastic buttons. Certain materials which in sebum removal qualify for use as lipophilic fluids, for example ethyl lactate, can be quite objectionable in their tendency to dissolve buttons, and if such a material is to be used in the compositions of the present invention, it will be formulated with water and/or other solvents such that the overall mix is not substantially damaging to buttons. Other lipophilic fluids, D5, for example, meet the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135, which are incorporated herein by reference.

Lipophilic fluids can include linear and cyclic polysiloxanes, hydrocarbons and chlorinated hydrocarbons, with the exception of PERC and DF2000 which are explicitly not covered by the lipophilic fluid definition as used herein. More preferred are the linear and cyclic polysiloxanes and hydrocarbons of the glycol ether, acetate ester, lactate ester families. Preferred lipophilic fluids include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

The level of lipophilic fluid, when present in the treating compositions according to the present invention, is preferably from about 70% to about 99.99%, more preferably from about 90% to about 99.9%, and even more preferably from about 95% to about 99.8% by weight of the treating composition.

The level of lipophilic fluid, when present in the consumable fabric article treating/cleaning compositions according to the present invention, is preferably from about 0.1% to about 90%, more preferably from about 0.5% to about 75%, and even more preferably from about 1% to about 50% by weight of the consumable fabric article treating/cleaning composition.

Lipophilic Fluid Adjuncts

During fabric treating processes utilizing lipophilic fluids, the lipophilic fluids typically end up containing contaminant components and/or contaminants, water and/or other "non-lipophilic fluid materials". Nonlimiting examples of these "non-lipophilic fluid materials" (i.e., contaminants) include surfactants, dyes, water, and soils such as lipstick and lipids such as triglycerides, fatty acids, squalene.

How the contaminants end up in the lipophilic fluid is not the focus of the present invention, rather the present invention focuses on removing and/or reducing the contaminants from the lipophilic fluids such that the lipophilic fluids are pure or substantially pure. In other words, such that the pure and/or substantially pure lipophilic fluids preferably comprise a level of the contaminants that does not impair the performance of the pure and/or substantially pure lipophilic fluid in subsequent steps of and/or new fabric treating processes. Preferably, the level of the contaminants present in the pure or substantially pure lipophilic fluid is from about 0% to about 1%, more preferably from about 0.00001% to about 0.1%, even more preferably from about 0.0001% to about 0.01% by weight of the lipophilic fluid.

A. Contaminant Component

Contaminant components and/or conventional contaminants may become mixed with the lipophilic fluid as a result of a fabric treating process utilizing both materials or may be added to a lipophilic fluid prior to using the lipophilic fluid for a fabric treating process. How the contaminant component and/or conventional contaminant comes to be present in the lipophilic fluid is not particularly important for the present invention. This present invention addresses the problem of removing the contaminant component and/or conventional contaminants from the lipophilic fluid.

Contaminant components (i.e., materials that have properties similar to contaminants) and conventional contaminants that may be present in the contaminant-containing lipophilic fluid of the present invention include, but are not limited to, conventional contaminants such as surfactants, dyes, lipids, soils, water and other non-lipophilic fluid materials.

A wide range of conventional contaminants can be used as treating agents in the treating compositions of the present invention.

Nonlimiting examples of these other contaminants include conventional anionic, nonionic, cationic and zwitterionic contaminants.

Contaminants included in the treating compositions afforded by the present invention comprise at least 0.01%, preferably at least about 0.1%, more preferably at least about 0.5%, even more preferably at least about 1%, most preferably at least about 3% to about 80%, more preferably to about 60%, most preferably to about 50% by weight of composition depending upon the particular contaminants used and the desired effects to be achieved.

The contaminant can be nonionic, anionic, amphoteric, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, amphoteric and zwitterionic classes, and species of these contaminants, is given in U.S. Pat. No. 3,664,961 issued to Norris on May 23, 1972. Preferred compositions comprise nonionic contaminants and/or mixtures of nonionic contaminants with other contaminants, especially anionic contaminants.

Nonlimiting examples of contaminants useful herein include the conventional $C_8$-$C_{18}$ alkyl ethoxylates ("AE"), with EO about 1-22, including the so-called narrow peaked alkyl ethoxylates and $C_6$-$C_{12}$ alkyl phenol alkoxylates (especially ethoxylates and mixed ethoxy/propoxy), alkyl dialkyl amine oxide, alkanoyl glucose amide, $C_{11}$-$C_{18}$ alkyl benzene sulfonates and primary, secondary and random alkyl sulfates, the $C_{10}$-$C_{18}$ alkyl alkoxy sulfates, the $C_{10}$-$C_{18}$ alkyl polyglycosides and their corresponding sulfated polyglycosides, $C_{12}$-$C_{18}$ alpha-sulfonated fatty acid esters, $C_{12}$-$C_{18}$ alkyl and alkyl phenol alkoxylates (especially ethoxylates and mixed ethoxy/propoxy), $C_{12}$-$C_{18}$ betaines, schercotaines and sulfobetaines ("sultaines"), $C_{10}$-$C_{18}$ amine oxides, and the like. Other conventional useful contaminants are listed in standard texts.

The contaminant components and/or contaminants may include the following nonlimiting examples:
a) Anionic contaminants (e.g., alkyl or aryl sulfates, aerosol derivatives, etc)
b) Cationic or basic contaminants (e.g., quaternary contaminants, primary and secondary amines, etc.)
c) Non-ionic contaminants (e.g., Brij® contaminants, Neodol® contaminants, etc.)

The contaminant component of the present invention is a material that is capable of suspending water in a lipophilic fluid and enhancing soil removal benefits of a lipophilic fluid. As a condition of their performance, said materials are soluble in the lipophilic fluid.

One class of materials can include siloxane-based surfactants (siloxane-based materials). The siloxane-based surfactants in this application may be siloxane polymers for other applications. The siloxane-based surfactants typically have a weight average molecular weight from 500 to 20,000. Such materials, derived from poly(dimethylsiloxane), are well known in the art. In the present invention, not all such siloxane-based surfactants are suitable, because they do not provide improved cleaning of soils compared to the level of cleaning provided by the lipophilic fluid itself.

Suitable siloxane-based surfactants comprise a polyether siloxane having the formula:

$$M_a D_b D'_c D''_d M'_{2-a}$$

wherein a is 0-2; b is 0-1000; c is 0-50; d is 0-50, provided that a+c+d is at least 1;

M is $R^1_{3-e} X_e SiO_{1/2}$ wherein $R^1$ is independently H, or a monovalent hydrocarbon group, X is hydroxyl group, and e is 0 or 1;

M' is $R^2_3 SiO_{1/2}$ wherein $R^2$ is independently H, a monovalent hydrocarbon group, or $(CH_2)_f$—$(C6H4)_g$O—$(C_2H_4O)_h$—$(C_3H_6O)_i$—$(C_kH_{2k}O)_j$—$R^3$, provided that at least one $R^2$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8;

D is $R^4_2 SiO_{2/2}$ wherein $R^4$ is independently H or a monovalent hydrocarbon group;

D' is $R^5_2 SiO_{2/2}$ wherein $R^5$ is independently $R^2$ provided that at least one $R^5$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8; and D" is $R^6_2 SiO_{2/2}$ wherein $R^6$ is independently H, a monovalent hydrocarbon group or $(CH_2)_l(C_6H_4)_m(A)_n$-[(L)$_o$-(A')$_p$-]$_q$-(L')$_r$Z(G)$_s$, wherein l is 1-10, m is 0 or 1; n is 0-5; o is 0-3; p is 0 or 1; q is 0-10; r is 0-3; s is 0-3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium; G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

Examples of the types of siloxane-based surfactants described herein above may be found in EP-1,043,443A1, EP-1,041,189 and WO-01/34,706 (all to GE Silicones) and U.S. Pat. Nos. 5,676,705, 5,683,977, 5,683,473, and EP-1,092,803A1 (all to Lever Brothers).

Nonlimiting commercially available examples of suitable siloxane-based surfactants are TSF 4446 (ex. General Electric Silicones), XS69-B5476 (ex. General Electric Silicones); Jenamine® HSX (ex. DelCon) and Y12147 (ex. OSi Specialties).

A second preferred class of materials suitable for the surfactant component is organic in nature. Preferred materials are organosulfosuccinate surfactants, with carbon chains of from about 6 to about 20 carbon atoms. Most preferred are organosulfosuccinates containing dialkly chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol® OT and Aerosol® TR-70 (ex. Cytec).

Another preferred class of surfactants is nonionic surfactants, especially those having low HLB values. Preferred nonionic surfactants have HLB values of less than about 10, more preferably less than about 7.5, and most preferably less than about 5. Preferred nonionic surfactants also have from about 6-20 carbons in the surfactant chain and from about 1-15 ethylene oxide (EO) and/or propylene oxide (PO) units in the hydrophilic portion of the surfactant (i.e., C6-20 EO/PO 1-15), and preferably nonionic surfactants selected from those within C7-11 EO/PO 1-5 (e.g., C7-11 EO 2.5).

The surfactant component, when present in the fabric article treating compositions of the present invention, preferably comprises from about 0.01% to about 10%, more preferably from about 0.02% to about 5%, even more preferably from about 0.05% to about 2% by weight of the fabric article treating composition.

The surfactant component, when present in the consumable detergent compositions of the present invention, preferably comprises from about 1% to about 99%, more preferably 2% to about 75%, even more preferably from about 5% to about 60% by weight of the consumable detergent composition.

In one embodiment, the treating agent is insoluble in water. In another embodiment, the treating agent is insoluble in water, but soluble in a lipophilic fluid. In yet another embodiment, the treating agent is insoluble in water, soluble in a lipophilic fluid and has an HLB of from about 1 to about 9 or from about 1 to about 7 or from about 1 to about 5.

In still another embodiment, the treating agent is insoluble in water and insoluble in a lipophilic fluid. In still yet another embodiment, the treating agent in conjunction with a solubilizing agent is at least partially soluble in a lipophilic fluid and/or water. In the solubilizing agent embodiment, the treating agent is present at a level in the treating composition at from about 0.001% to about 5% or from about 0.001% to about 3% or from about 0.001% to about 1% by weight of the treating composition.

Nonlimiting examples of suitable treating agents include treating agents commercially available from Dow Corning under tradenames such as DC 1248, SF1528 DC5225C and DCQ4 3667; and Silwets® from Witco under tradenames such as L8620, L7210, L7220.

The contaminant component, when present in the contaminant-containing lipophilic fluid can be present at any level, typically the contaminant component is present at a level of from about 0.01% to about 10%, more preferably from about 0.02% to about 5%, even more preferably from about 0.05% to about 2% by weight of the cleaning composition.

Another contaminant component/contaminant that may be present in the contaminant-containing lipophilic fluid is characterized as non-silicone additives. The non-silicone additives preferably comprise a strongly polar and/or hydrogen-bonding head group. Examples of the strongly polar and/or hydrogen-bonding head group are alcohols, carboxylic acids, sulfates, sulphonates, phosphates, phosphonates, and nitrogen containing materials. Preferred non-silicone additives are nitrogen containing materials selected from the group consisting of primary, secondary and tertiary amines, diamines, triamines, ethoxylated amines, amine oxides, amides, betaines, quaternary ammonium salts, and mixtures thereof. Alkylamines are particularly preferred. Additionally, branching on the alkyl chain to help lower the melting point is highly preferred. Even more preferred are primary alkylamines comprising from about 6 to about 22 carbon atoms.

Particularly preferred primary alkylamines are oleylamine (commercially available from Akzo under the trade name Armeen® OLD), dodecylamine (commercially available from Akzo under the trade name Armeen® 12D), branched $C_{16}$-$C_{22}$ alkylamine (commercially available from Rohm & Haas under the trade name Primene® JM-T) and mixtures thereof.

The non-silicone additives, when present, may be present in the cleaning compositions of the present invention at a level of from about 0.01% to about 10%, more preferably from about 0.02% to about 5%, even more preferably from about 0.05% to about 2% by weight of the cleaning composition.

Polar Solvent

The contaminant-containing lipophilic fluid of the present invention may comprise a polar solvent. Non-limiting examples of polar solvents include: water, alcohols, glycols, polyglycols, ethers, carbonates, dibasic esters, ketones, other oxygenated solvents, and mixtures thereof. Further examples of alcohols include: C1-C126 alcohols, such as propanol, ethanol, isopropyl alcohol, etc. . . , benzyl alcohol, and diols such as 1,2-hexanediol. The Dowanol series by Dow Chemical are examples of glycols and polyglycols useful in the present invention, such as Dowanol TPM, TPnP, DPnB, DPnP, TPnB, PPh, DPM, DPMA, DB, and others. Further examples include propylene glycol, butylene glycol, polybutylene glycol and more hydrophobic glycols. Examples of carbonate solvents are ethylene, propylene and butylene carbonantes such as those available under the Jeffsol tradename. Polar solvents for the present invention can be further identified through their dispersive ($\delta_D$), polar ($\delta_P$) and hydrogen bonding ($\delta_H$) Hansen solubility parameters. Preferred polar solvents or polar solvent mixtures have fractional polar ($f_P$) and fractional hydrogen bonding ($f_H$) values of $f_P$>0.02 and $f_H$0.10, where $f_P=\delta_P/(\delta_D+\delta_P+\delta_H)$ and $f_H=\delta_H/(\delta_D+\delta_P+\delta_H)$, more preferably $f_P$>0.05 and $f_H$>0.20, and most preferably $f_P$>0.07 and $f_H$>0.30.

Polar solvent may be present in the contaminant-containing lipophilic fluid at any level, typically it is present in the contaminant-containing lipophilic fluid at a level of from about 0.001% to about 10%, more preferably from about 0.005% to about 5%, even more preferably from about 0.01% to about 1% by weight of the contaminant-containing lipophilic fluid.

In one embodiment, the contaminant-containing lipophilic fluid comprises from about 0% to about 5% or from about 0% to about 3% or from about 0.0001% to about 1% by weight of the contaminant-containing lipophilic fluid of a polar solvent.

In the treating composition of the present invention, the levels of polar solvent can be from about 0 to about 70%, preferably 1 to 50%, even more preferably 1 to 30% by weight of the detergent composition.

In another embodiment, the surfactant-containing lipophilic fluid comprises a surfactant selected from the group consisting of anionic surfactants, cationic surfactants, nonionic surfactants, zwitterionic surfactants and mixtures thereof.

Adsorbent Material

The adsorbent material useful in the processes of the present invention comprises a polar agent and an apolar agent. Typically, the polar agents and apolar agents are present in the adsorbent material at a ratio of from about 1:10 to about 10:1 or from about 1:5 to about 5:1 or from about 1:2 to about 3:1.

In one embodiment, the adsorbent material has a surface area of from about 10 $m^2$/gram to about 1000 $m^2$/gram or from about 100 $m^2$/gram to about 1000 $m^2$/gram or from about 250 $m^2$/gram to about 1000 $m^2$/gram or even about 500 $m^2$/gram to about 1000 $m^2$/gram.

In one embodiment, the adsorbent material has an average particle size of from about 0.1 μm to about 250 μm.

In another embodiment, the adsorbent material has an average particle size of from about 0.1 μm to about 500 μm.

In another embodiment, the adsorbent material comprises a polar and apolar agent and another agent selected from the group consisting of: a polar agent, an apolar agent and optionally, a charged agent, wherein two or more agents are in the form of commingled agents in a unitary physical form.

In yet another embodiment, the adsorbent material comprises a polar and apolar agent and another agent selected from the group consisting of: a polar agent, an apolar agent and optionally, a charged agent, wherein two or more agents are in the form of layered agents.

In still another embodiment, the adsorbent material comprises a separate, discrete polar and apolar agent and a separate, discrete charged agent, such that the contaminant-containing lipophilic fluid contacts both the separate, discrete agents.

In still yet another embodiment, the adsorbent material comprises discrete particles.

In even still another embodiment, the adsorbent material is in the form of discrete particles.

Alternatively, the adsorbent material is in the form of a fibrous structure. Typically the fibrous structure is a nonwoven fibrous structure. However, it could be a woven fibrous structure.

In another embodiment, the adsorbent material is in the form of discrete particles that are embedded in and/or coated on and/or impregnated in and/or bound to a fibrous structure.

The adsorbent material may comprise (1) charged agents and (2) polar and apolar agents commingled together. The polar agents are typically in the form of discrete particles and the apolar agents are typically in the form of a fibrous structure, wherein the discrete particle polar agents are embedded in and/or coated on and/or impregnated in and/or bound to a fibrous structure, typically a non-woven fibrous structure.

The present invention also encompasses the regeneration of such adsorbent agents, especially the charged agents, once they have adsorbed a contaminant, such as a surfactant, by exposing the adsorbent agents to an environmental condition that is capable of removing the adsorbed contaminant from the adsorbent agent. For example, a charged agent can be exposed to an environmental condition to release any residual lipophilic fluid from the charged agent. Also, a charged agent can be exposed to an environmental condition to release the contaminant from the charged agent. Nonlimiting examples of suitable environmental conditions include exposing the charged agent to an acid, a base and/or a salt. The charged agents that are capable of regeneration typically exhibit a $pK_a$ or $pK_b$ of from about 2 to about 8. Charged agents that are capable of regeneration can be reused for multi-cycle surfactant removal from lipophilic fluids.

a. Polar Agents

In one embodiment, a polar agent useful in the adsorbent material of the present invention has the formula:

$$Y_a-O_bX$$

wherein Y is Si, Al, Ti, P; a is from about 1 to about 5; b is from about 1 to about 10; and X is a metal.

In another embodiment, a polar agent suitable for use in the adsorbent material of the present invention is selected from the group consisting of: silica, diatomaceous earth, aluminosilicates, polyamide resin, alumina, hydrogels, zeolites and mixtures thereof. Preferably, the polar agent is silica, more specifically silica gel.

Nonlimiting examples of monomers that comprise the hydrogels of the present invention include hydroxyalkyl acrylates, hydroxyalkyl methacrylates, N-substituted acrylamides, N-substituted methacrylamides, N-vinyl-2-pyrrolidone, N-acroylpyrrolidone, acrylics, methacrylics, vinyl acetate, acrylonitrile, styrene, acrylic acid, methacrylic acid, crotonic acid, sodium styrene sulfonate, sodium 2-sulfoxyethyl methacrylate, 2-acrylamido-2-methylpropanesulfonic acid, vinylpyridine, aminoethyl methacrylates, 2-methacryloyloxytrimethylammonium chloride, N,N'-methylenebisacrylamide, poly(ethylene glycol) dimethacrylate, 2,2'-(p-phenylenedioxy diethyl dimethacrylate, divinylbenzene and triallylamine.

In yet another embodiment, a polar agent suitable for use in the adsorbent material of the present invention has an average particle size of from about 0.5 μm to about 500 μm.

b. Apolar Agents

Apolar agents suitable for use in the adsorbent material of the present invention comprise one or more of the following: activated carbon, polystyrene, polyethylene, and/or divinyl benzene. The activated carbon may be in powdered form and/or has a surface area of from about 50 m²/gram to about 200 m²/gram, typically its around about 75 m²/gram to about 125 m²/gram.

c. Charged Agents

In one embodiment, the charged agent is selected from the group consisting of: anionic materials, cationic materials, zwitterionic materials and mixtures thereof.

In another embodiment, the charged agent has the formula:

[W—Z]T wherein W is Si, Al, Ti, P, or a polymer backbone; Z is a charged substituent group and T is a counterion selected from alkaline, alkaline earth metals and mixtures thereof. For example, T may be: Sodium, potassium, ammonium, alkylammonium derivatives, hydrogen ion; chloride, hydroxide, fluoride, iodide, carboxylate, etc.

The polymer backbone is typically comprises a material selected from the group consisting of: polystryrene, polyethylene, polydivinyl benzene, polyacrylic acid, polyacrylamide, polysaccharide, polyvinyl alcohol, copolymers of these and mixtures thereof.

The charged substituent typically comprises sulfonates, phosphates, quaternary ammonium salts and mixtures thereof. The charged substituent may comprise alcohols; diols; salts of carboxylates; salts of primary and secondary amines and mixtures thereof The W typically comprises from about 1% to about 15% by weight of W of the charged agent.

In another embodiment, the charged agent is capable of regeneration such that the charged agent can release any contaminant that it temporarily removes from the contaminant-containing lipophilic fluid upon being exposed to an environmental condition. An "environmental condition" as used herein means any physical or chemical condition that causes the charged agent to release the contaminant. Nonlimiting examples of environmental conditions include exposing the charged agent to an acid, a base and/or a salt. The charged agents that are capable of regeneration typically exhibit a $pK_a$ or $pK_b$ of from about 2 to about 8. Charged agents that are capable of regeneration can be reused for multi-cycle contaminant removal from lipophilic fluids.

Nonlimiting Example of an Adsorbent Material

The adsorbent material comprises a substrate of either silica gel, polystyrene or polystyrene/divinyl benzene functionalized with either strong ionic species (e.g., sulfonic acid salts or quaternary ammonium salts) or with weak ionic species (e.g., carboxylate salts, alcohols, diols, salts of primary amines, salts of secondary amines, salts of mixtures of primary and secondary amines) with particles sizes from 5 μm to 400 μm. The adsorbents can be contained in cartridges consisting of stainless steel, polypropylene, and polyethylene. The loadings based on % carbon range from 2% to 10%. For ion exchange resins the capacity ranges from approximately 1 milliequivalent/gram to 5 milliequivalents/gram for silica-based substrates and 0.2 milliequivalents/mL to 0.4/mL for polystyrene- or polystyrene/divinyl benzene-based substrates.

Absorbent Materials

The absorbent materials of the present invention comprise one or more water absorbing agents. Suitable water absorbing agents and/or absorbent materials comprising water absorbing agents of the present invention are described herein below.

The present invention also encompasses the regeneration of such water absorbing agents, once they have absorbed water, by exposing the water absorbing agents to an environmental condition that is capable of removing the absorbed water from the water absorbing agent. Nonlimiting examples of suitable environmental conditions include heat, pH, ionic strength, vacuum, mechanical force (i.e. gas flow, centrifugation), electric field and mixtures thereof. The regeneration process may also include condensing the water removed from the water absorbing agent so that any remaining lipophilic fluid within the water can be separated therefrom Hydrogel-Forming Absorbent Polymers The absorbent polymers of the present invention preferably comprise at least one hydrogel-forming absorbent polymer (also referred to as hydrogel-forming polymer). Hydrogel-forming polymers useful in the present invention include a variety of water-insoluble, but water-swellable polymers capable of absorbing aqueous liquids. Such hydrogel-forming polymers are well known in the art and any of these polymers are useful in the present invention.

Hydrogel-forming absorbent polymers are also commonly referred to as "hydrocolloids," or "absorbent" materials and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, hydrogel-forming absorbent polymers useful in the present invention have a multiplicity of anionic or cationic functional groups such as sulfonic acid or amide or amino groups, and more typically carboxy, groups. Examples of polymers suitable for use herein include those that are prepared from polymerizable, unsaturated, acid-containing monomers. Examples of cationic polymers with cationic groups are prepared from base-containing monomers. Thus, such monomers include the olefinically unsaturated acids and anhydrides that contain at least one carbon-to-carbon olefinic double bond. More specifically, these monomers can be selected from olefinically unsaturated carboxylic acids and acid anhydrides, olefinically unsaturated sulfonic acids, and mixtures thereof. As indicated above, the nature of the hydrogel-forming absorbent polymer is not critical to the present invention; nonetheless, the selection of the optimal polymeric material may enhance the performance characteristics of the present invention. The disclosure that follows describes preferred properties of the absorbent polymers useful herein. These properties should not be interpreted as limitations; rather, they merely indicate the progression that has occurred in the absorbent polymer art over the past several years.

Some non-acid monomers can also be included, usually in minor amounts, in preparing the hydrogel-forming absorbent polymers herein. Such non-acid monomers can include, for example, the water-soluble or water-dispersible esters of the acid-containing monomers, as well as monomers that contain no carboxylic or sulfonic acid groups at all. Optional non-acid monomers can thus include monomers containing the following types of functional groups: carboxylic acid or sulfonic acid esters, hydroxyl groups, amide-groups, amino groups, nitrile groups, quaternary ammonium salt groups, aryl groups (e.g., phenyl groups, such as those derived from styrene monomer). These non-acid monomers are well-known materials and are described in greater detail, for example, in U.S. Pat. No. 4,076,663 (Masuda et al.), issued Feb. 28, 1978, and in U.S. Pat. No. 4,062,817 (Westerman), issued Dec. 13, 1977, both of which are incorporated by reference.

Olefinically unsaturated carboxylic acid and carboxylic acid anhydride monomers include the acrylic acids typified by acrylic acid itself, methacrylic acid, ethacrylic acid, α-chloroacrylic acid, a-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-sterylacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

Preferred hydrogel-forming absorbent polymers for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S. Pat. Nos. 3,661,875, 4,076,663, 4,093,776, 4,666,983, and 4,734,478.

Most preferred polymer materials for use in making the hydrogel-forming absorbent polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e., poly (sodium acrylate/acrylic acid)). Network crosslinking renders the polymer substantially water-insoluble and, in part, determines the absorptive capacity and extractable polymer content characteristics of the hydrogel-forming absorbent polymers. Processes for network crosslinking these polymers and typical network crosslinking agents are described in greater detail in U.S. Pat. No. 4,076,663.

While the hydrogel-forming absorbent polymer is preferably of one type (i.e., homogeneous), mixtures of polymers can also be used in the present invention. For example, mixtures of starch-acrylic acid graft copolymers and slightly network crosslinked polymers of partially neutralized polyacrylic acid can be used in the present invention.

The hydrogel-forming polymer component may also be in the form of a mixed-bed ion-exchange composition comprising a cation-exchange hydrogel-forming absorbent polymer and an anion-exchange hydrogel-forming absorbent polymer. Such mixed-bed ion-exchange compositions are described in, e.g., U.S. patent application Ser. No. 09/130,321, filed Jan. 7, 1998 by Ashraf, et al. (P&G Case 6976R—titled "ABSORBENT POLYMER COMPOSITIONS WITH HIGH SORPTION CAPACITY AND HIGH FLUID PERMEABILITY UNDER AN APPLIED PRES- SURE"); and U.S. Pat. No. 6,121,509; the disclosure of each of which is incorporated herein by reference.

The hydrogel-forming absorbent polymers useful in the present invention can have a size, shape and/or morphology varying over a wide range. These polymers can be in the form of particles that do not have a large ratio of greatest dimension to smallest dimension (e.g., granules, pulverulents, interparticle aggregates, interparticle crosslinked aggregates, and the like) and can be in the form of fibers, sheets, films, foams, flakes and the like. The hydrogel-forming absorbent polymers can also comprise mixtures with low levels of one or more additives, such as for example powdered silica, zeolites, activated carbon, molecular sieves, surfactants, glue, binders, and the like. The components in this mixture can be physically and/or chemically associated in a form such that the hydrogel-forming polymer component and the non-hydrogel-forming polymer additive are not readily physically separable.

The hydrogel-forming absorbent polymers can be essentially non-porous (i.e., no internal porosity) or have substantial internal porosity.

For particles as described above, particle size is defined as the dimension determined by sieve size analysis. Thus, for example, a particle that is retained on a U.S.A. Standard Testing Sieve with 710 micron openings (e.g., No. 25 U.S. Series Alternate Sieve Designation) is considered to have a size greater than 710 microns; a particle that passes through a sieve with 710 micron openings and is retained on a sieve with 500 micron openings (e.g., No. 35 U.S, Series Alternate Sieve Designation) is considered to have a particle size between 500 and 710 µm; and a particle that passes through a sieve with 500 micron openings is considered to have a size less than 500 µm. The mass median particle size of a given sample of hydrogel-forming absorbent polymer particles is defined as the particle size that divides the sample in half on a mass basis, i.e., one-half of the sample by weight will have a particle size less than the mass median size and one-half of the sample will have a particle size greater than the mass median size. A standard particle-size plotting method (wherein the cumulative weight percent of the particle sample retained on or passed through a given sieve size opening is plotted versus sieve size opening on probability paper) is typically used to determine mass median particle size when the 50% mass value does not correspond to the size opening of a U.S.A. Standard Testing Sieve. These methods for determining particle sizes of the hydrogel-forming absorbent polymer particles are further described in U.S. Pat. No. 5,061,259 (Goldman et al.), issued Oct. 29, 1991, which is incorporated by reference.

For particles of hydrogel-forming absorbent polymers useful in the present invention, the particles will generally range in size from about 1 to about 2000 µm, more preferably from about 20 to about 1000 µm. The mass median particle size will generally be from about 20 to about 1500 µm, more preferably from about 50 µm to about 1000 µm, and even more preferably from about 100 to about 800 µm. For embodiments containing films, membranes, foam, fibers, or polymers coated on a substrate like a nonwoven, particles larger than the ones described above may be useful or even preferred.

In specific embodiments, other properties of the absorbent polymer may also be relevant. In such embodiments, the materials may have one or more of the properties described by U.S. Pat. No. 5,562,646, issued Oct. 8, 1996 to Goldman et al. and U.S. Pat. No. 5,599,335, issued Feb. 4, 1997 to Goldman et al., the disclosure of each of which is incorporated by reference herein.

The basic hydrogel-forming absorbent polymer can be formed in any conventional manner. Typical and preferred processes for producing these polymers are described in U.S. Reissue Pat. No. 32,649 (Brandt et al.), issued Apr. 19, 1988, U.S. Pat. 4,666,983 (Tsubakimoto et al.), issued May 19, 1987, and U.S. Pat. No. 4,625,001 (Tsubakimoto et al.), issued Nov. 25, 1986, all of which are incorporated by reference.

Preferred methods for forming the basic hydrogel-forming absorbent polymer are those involving aqueous solution or other solution polymerization methods. As described in the above-referenced U.S. Pat. No. Reissue 32,649, aqueous solution polymerization involves the use of an aqueous reaction mixture to carry out polymerization. The aqueous reaction mixture is then subjected to polymerization conditions that are sufficient to produce in the mixture, substantially water-insoluble, slightly network crosslinked polymer. The mass of polymer formed can then be pulverized or chopped to form individual particles.

More specifically, the aqueous solution polymerization method for producing the hydrogel-forming absorbent polymer comprises the preparation of an aqueous reaction mixture in which to carry out the polymerization. One element of such a reaction mixture is the acid group-containing monomer that will form the "backbone" of the hydrogel-forming absorbent polymer to be produced. The reaction mixture will generally comprise about 100 parts by weight of the monomer. Another component of the aqueous reaction mixture comprises a network crosslinking agent. Network crosslinking agents useful in forming the hydrogel-forming absorbent polymer according to the present invention are described in more detail in the above-referenced U.S. Reissue Pat. No. 32,649, U.S. Pat. Nos. 4,666,983, and 4,625,001. The network crosslinking agent will generally be present in the aqueous reaction mixture in an amount of from about 0.001 mole percent to about 5 mole percent based on the total moles of monomer present in the aqueous mixture (about 0.01 to about 20 parts by weight, based on 100 parts by weight of the monomer). An optional component of the aqueous reaction mixture comprises a free radical initiator including, for example, peroxygen compounds such as sodium, potassium, and ammonium persulfates, caprylyl peroxide, benzoyl peroxide, hydrogen peroxide, cumene hydroperoxides, tertiary butyl diperphthalate, tertiary butyl perbenzoate, sodium peracetate, sodium percarbonate, and the like. Other optional components of the aqueous reaction mixture comprise the various non-acidic co-monomers, including esters of the essential unsaturated acidic functional group-containing monomers or other co-monomers containing no carboxylic or sulfonic acid functionalities.

The aqueous reaction mixture is subjected to polymerization conditions that are sufficient to produce in the mixture substantially water-insoluble, but water-swellable, hydrogel-forming absorbent slightly network crosslinked polymers. The polymerization conditions are also discussed in more detail in the three above-referenced patents. Such polymerization conditions generally involve heating (thermal activation techniques) to a polymerization temperature from about 0° to about 100° C., more preferably from about 5° to about 40° C. Polymerization conditions under which the aqueous reaction mixture is maintained can also include, for example, subjecting the reaction mixture, or portions thereof, to any conventional form of polymerization activating irradiation. Radioactive, electronic, ultraviolet, and electromagnetic radiation are alternative conventional polymerization techniques.

The acid functional groups of the hydrogel-forming absorbent polymer formed in the aqueous reaction mixture are also preferably neutralized. Neutralization can be carried out in any conventional manner that results in at least about 25 mole percent, and more preferably at least about 50 mole percent, of the total monomer utilized to form the polymer being acid group-containing monomers that are neutralized with a salt-forming cation. Such salt-forming cations include, for example, alkali metals, ammonium, substituted ammonium and amines as discussed in further detail in the above-references U.S. Reissue Pat. No. 32,649.

While it is preferred that the particulate versions of hydrogel-forming absorbent polymer be manufactured using an aqueous solution polymerization process, it is also possible to carry out the polymerization process using multiphase polymerization processing techniques such as inverse emulsion polymerization or inverse suspension polymerization procedures. In the inverse emulsion polymerization or inverse suspension polymerization procedures, the aqueous reaction mixture as described before is suspended in the form of tiny droplets in a matrix of a water-immiscible, inert organic solvent such as cyclohexane. The resultant particles of hydrogel-forming absorbent polymer are generally spherical in shape. Inverse suspension polymerization procedures are described in greater detail in U.S. Pat. No. 4,340,706 (Obayasashi et al.), issued Jul. 20, 1982, U.S. Pat. No. 4,506,052 (Flesher et al.), issued Mar. 19, 1985, and U.S. Pat. No. 4,735,987 (Morita et al.), issued Apr. 5, 1988, all of which are incorporated by reference.

Surface crosslinking of the initially formed polymers is a preferred process for obtaining hydrogel-forming absorbent polymers having relatively high porosity hydrogel-layer ("PHL"), performance under pressure ("PUP") capacity and saline flow conductivity ("SFC") values, which may be beneficial in the context of the present invention. Suitable general methods for carrying out surface crosslinking of hydrogel-forming absorbent polymers according to the present invention are disclosed in U.S. Pat. No. 4,541,871 (Obayashi), issued Sep. 17, 1985; published PCT application WO92/16565 (Stanley), published Oct. 1, 1992, published PCT application WO90/08789 (Tai), published Aug. 9, 1990; published PCT application WO93/05080 (Stanley), published Mar. 18, 1993; U.S. Pat. No. 4,824,901 (Alexander), issued Apr. 25, 1989; U.S. Pat. No. 4,789,861 (Johnson), issued Jan. 17, 1989; U.S. Pat. No. 4,587,308 (Makita), issued May 6, 1986; U.S. Pat. No. 4,734,478 (Tsubakimoto), issued Mar. 29, 1988; U.S. Pat. No. 5,164,459 (Kimura et al.), issued Nov. 17, 1992; published German patent application 4,020,780 (Dahmen), published Aug. 29, 1991; and published European patent application 509,708 (Gartner), published Oct. 21, 1992; all of which are incorporated by reference. See also, U.S. Pat. No. 5,562,646 (Goldman et al.), issued Oct. 8, 1996 and U.S. Pat. No. 5,599,335 (Goldman et al.), issued Feb. 4, 1997, herein incorporated by reference.

For some embodiments of the present invention, it is advantageous if the hydrogel-forming absorbent polymer particles prepared according to the present invention are typically substantially dry. The term "substantially dry" is used herein to mean that the particles have a liquid content, typically water or other solution content, less than about 50%, preferably less than about 20%, more preferably less than about 10%, by weight of the particles. In general, the liquid content of the hydrogel-forming absorbent polymer particles is in the range of from about 0.01% to about 5% by weight of the particles. The individual particles can be dried by any conventional method such as by heating. Alternatively, when the particles are formed using an aqueous reaction mixture, water can be removed from the reaction mixture by azeotropic distillation. The polymer-containing aqueous reaction mixture can also be treated with a dewatering solvent such as methanol. Combinations of these drying procedures can also be used. The dewatered mass of polymer can then be chopped or pulverized to form substantially dry particles of the hydrogel-forming absorbent polymer.

Other Gelling Polymers

Gels based on acrylamide are also suitable for use in the present invention. Specifically suitable are acrylamide, 2-(acryloyloxyl)ethyl acid phosphate, 2-acyrlamido-2-methylpropanesulfonic acid, 2-dimethylaminoethyl acrylate, 2,2'-bis(acrylamido)acetic acid, 3-(methacrylamido)propyltrimethylammonium chloride, acrylamidomethylpropanedimethylammonium chloride, acrylate, acrylonitrile, acrylic acid, diallyldimethylammonium chloride, diallylammonium chloride, dimethylaminoethyl acrylate, dimethylaminoethyl methacrylate, ethylene glycol, dimethacrylate, ethylene glycol monomethacrylate, methacrylamide, methylacrylamidopropyltrimethylammonium chloride, N,N-dimethylacrylamide, N-[2 [[5-(dimethylamino)1-naphthaleny]sulfonyl]amino[ethyl]]-2-acrylamide, N-[3-dimehtylamino)propyl]acrylamide hydrochloride, N-[3-(dimethylamino)propyl)methacrylamide hydrochloride, poly(diallyldimethylammonium chloride), sodium 2-(2-carboxybenzoyloxy)ethyl methacrylate, sodium acrylate, sodium allyl acetate, sodium methacrylate, sodium styrene sulfonate, sodium vinylacetate, triallylamine, trimethyl(N-acryloyl-3-aminopropyl)ammonium chloride, triphenylmethane-leuco derivatives, vinyl-terminated polymethylsiloxane, N-(2-ethoxyethyl)acrylamide, N-3-(methoxypropyl)acrylamide, N-(3-ethoxypropyl)acrylamide, N-cyclopropylacrylamide, N-n-propylacrylamide, and N-(tetrahydrofurfuryl)acrylamide.

Also suitable are the gels based on N-isopropylacrylamide. These can include N-isopropylacrylamide, 2-(diethylamino)ethyl methacrylate, 2-(dimethylamino)ethyl methacrylate, 2-acrylamido-2-methyl-1-propanesulfonacrylate, acrylic acid, acrylamide alkyl methacrylate, bis(4-dimethylamino)phenyl)(4-vinylphenyl)methyl leucocyanide, Concanavalin A (Lecithin), hexyl methacrylate, lauryl methacrylate, methacrylic acid, methacrylamidopropyltrimethylammonium chloride, n-butyl methacrylate, poly(tetrafluoroethylene), polytetramethylene ether glycol, sodium acrylate, sodium methacrylate, sodium vinyl sulfonate, and vinyl-terminated polymethylsiloxane.

Also suitable are the gels based on N,N'-diethylacrylamide. These can include N,N'-diethylacrylamide, methyacrylamidopropyltrimethylammonium chloride, N-acryloxysuccinimide ester, N-tert-butylacrylamide, and sodium methacrylate.

Gels based on acrylate are also suitable. These may include 2-dimethylaminoethyl acrylate, 2-acrylamido-2-methylpropanesulfonic acid, acrylamide, triallylamine, acrylate, acrylamide, methyl methacrylate, divinylbenzene, N,N-dimehtylaminoethyl methacrylate, poly(oxytetramethylene dimethacrylate), poly(2-hydroxyethyl methacrylate), poly(2-hydroxypropyl methacrylate), and polyethylene glycol methacrylate.

Also suitable are the gels based on various monomers. These can include acrylic acid, methacrylamidopropyltrimethylammonium chloride, Collagen, dipalmitoylphosphatidylethanolamine, poly[4-6-decadiene-1,10-diolbis(n-butoxycarbonylmethyl urethane)], poly[bis[aminoethoxy) ethoxy]phosphazene], poly[bis[(butoxyethoxy)ethoxy] phosphazene], poly[bis[ethoxyethoxy)ethoxy] phosphazene], poly[bis[methoxyethoxy)ethoxy] phosphazene], poly[bis[methoxyethoxy)phosphazene], polydimethylsiloxane, polyethylene oxide, poly(ethylene-dimethylsiloxane-ethylene oxide), poly(N-acrylopyrrolidine), poly[n,n-dimethyl-N-[(methacryloyloxyethyl]-N-(3-sulfopropyl)ammonium betaine], polymethacrylic acid, polymethacryloyl dipeptide, polyvinyl alcohol, polyvinyl alcohol-vinyl acetate, polyvinyl methyl ether, furan-modified poly(n-acetylethylene imine), and malein imide-modified poly(n-acetylethylene imine).

Also suitable as hydrogels are hydrogels that comprise a monomer selected from the group consisting of: include hydroxyalkyl acrylates, hydroxyalkyl methacrylates, N-substituted acrylamides, N-substituted methacrylamides, N-vinyl-2-pyrrolidone, N-acroylpyrrolidone, acrylics, methacrylics, vinyl acetate, acrylonitrile, styrene, acrylic acid, methacrylic acid, crotonic acid, sodium styrene sulfonate, sodium 2-sulfoxyethyl methacrylate, 2-acrylamido-2-methylpropanesulfonic acid, vinylpyridine, aminoethyl methacrylates, 2-methacryloyloxytrimethylammonium chloride, N,N'-methylenebisacrylamide, poly(ethylene glycol) dimethacrylate, 2,2'-(p-phenylenedioxy diethyl dimethacrylate, divinylbenzene and triallylamine.

Also suitable are the gels disclosed in U.S. Pat. Nos. 4,555,344, 4,828,710, and European Application EP 648,521 A2 (all of which are herein incorporated by reference).

High Surface Area Materials

In addition to the osmotic absorbent (for example, hydrogel-forming absorbent polymers), the present invention can comprise a high surface area material. It is this high surface area material that provides, either itself or in combination with the hydrogel-forming absorbent polymer, the separation apparatus or vessel with high capillary sorption absorbent capacity. As discussed herein, high surface area materials are described, in one regard, in terms of their capillary sorption absorbent capacity (measured without hydrogel-forming polymer or any other optional material contained in the separation apparatus or vessel). It is recognized that materials having high surface areas may have uptake capacities at very high suction heights (e.g., 100 cm or higher). This allows the high surface area materials to provide one or both of the following functions: i) a capillary pathway of liquid to the osmotic absorbents, and/or ii) additional absorbent capacity. Thus, while the high surface area materials may be described in terms of their surface area per weight or volume, applicants herein alternatively use capillary sorption absorbent capacity to describe the high surface area material because capillary sorption absorbent capacity is a performance parameter that generally will provide the separation apparatus or vessel used in the present invention with the requisite suction capabilities to provide improved absorbent articles. It will be recognized that certain high surface area materials, e.g. glass microfibers, will themselves not exhibit particularly high capillary sorption absorbent capacity at all heights, especially very high heights (e.g., 100 cm and higher). Nonetheless, such materials may provide the desired capillary pathway of liquid to the hydrogel-forming absorbent polymer or other osmotic absorbent to provide the requisite capillary sorption absorbent capacities, even at relatively high heights, when combined with the hydrogel-forming polymer or other osmotic absorbent.

Any material having sufficient capillary sorption absorbent capacity when used in combination with the hydrogel-forming absorbent polymer or other osmotic absorbent will be useful in the separation apparatus or vessel of the present invention. In this regard, the term "high surface area material" refers to any material that itself (i.e., as measured without the osmotic absorbent or any other optional material that is contained in the separation apparatus or vessel) exhibits one or more of the following capillary sorption absorbent capacities: (I) A capillary sorption absorbent capacity of at least about 2 g/g at a suction height of 100 cm, preferably at least about 3 g/g, still more preferably at least about 4 g/g, and still more preferably at least about 6 g/g, at a height of 100 cm; (II) A capillary sorption absorbent capacity at a height of 35 cm of at least about 5 g/g, preferably at least about 8 g/g, more preferably at least about 12 g/g; (III) A capillary sorption absorbent capacity at a height of 50 cm of at least about 4 g/g, preferably at least about 7 g/g, more preferably at least about 9 g/g; (IV) A capillary sorption absorbent capacity at a height of 140 cm of at least about 1 g/g, preferably at least about 2 g/g, more preferably at least about 3 g/g, still more preferably at least about 5 g/g; or (V) A capillary sorption absorbent capacity at a height of 200 cm of at least about 1 g/g, preferably at least about 2 g/g, more preferably at least about 3 g/g, still more preferably at least about 5 g/g.

In one embodiment, the high surface area material will be fibrous (hereafter referred to as "high surface area fibers") in character, so as to provide a fibrous web or fibrous matrix when combined with the hydrogel-forming absorbent polymer or other osmotic absorbent. Alternatively, the high surface area material will be an open-celled, hydrophilic polymeric foam (hereafter referred to as "high surface area polymeric foams" or more generally as "polymeric foams"). These materials are described in detail below.

High surface area fibers useful in the present invention include those that are naturally occurring (modified or unmodified), as well as synthetically made fibers. The high surface area fibers have surface areas much greater than fibers typically used in absorbent articles, such as wood pulp fibers. The high surface area fibers used in the present invention will desirably be hydrophilic. As used herein, the term "hydrophilic" describes fibers, or surfaces of fibers, that are wettable by aqueous liquids (e.g., aqueous body liquids) deposited on these fibers. Hydrophilicity and wettability are typically defined in terms of contact angle and the surface tension of the liquids and solids involved. This is discussed in detail in the American Chemical Society publication entitled Contact Angle, Wettability and Adhesion, edited by Robert F. Gould (Copyright 1964). A fiber, or surface of a fiber, is said to be wetted by a liquid (i.e., hydrophilic) when either the contact angle between the liquid and the fiber, or its surface, is less than 90 degrees, or when the liquid tends to spread spontaneously across the surface of the fiber, both conditions normally co-existing. Conversely, a fiber or surface is considered to be hydrophobic if the contact angle is greater than 90 degrees and the liquid does not spread spontaneously across the surface of the fiber. The hydrophilic character of the fibers useful herein may be inherent in the fibers, or the fibers may be naturally hydrophobic fibers that are treated to render them hydrophilic. Materials and methods for providing hydrophilic character to naturally hydrophobic fibers are well known.

High surface area fibers useful herein will have capillary suction specific surface areas in the same range as the polymeric foams described below. Typically, however, high surface area fibers are characterized in terms of BET surface area.

High surface area fibers useful herein include glass microfibers such as, for example, glass wool available from Evanite Fiber Corp. (Corvallis, Oreg.). Glass microfibers useful herein will typically have fiber diameters of not more than about 0.8 µm, more typically from about 0.1 µm to about 0.7 µm. These microfibers will have surface areas of at least about 2 $m^2/g$, preferably at least about 3 $m^2/g$. Typically, the surface area of glass microfibers will be from about 2 $m^2/g$ to about 15 $m^2/g$. Representative glass microfibers for use herein are those available from Evanite Fiber Corp. as type 104 glass fibers, which have a nominal fiber diameter of about 0.5 µm. These glass microfibers have a calculated surface area of about 3.1 $m^2/g$.

Another type of high surface area fibers useful herein are fibrillated cellulose acetate fibers. These fibers (referred to herein as "fibrets") have high surface areas relative to cellulose-derived fibers commonly employed in the absorbent article art. Such fibrets have regions of very small diameters, such that their particle size width is typically from about 0.5 to about 5 µm. These fibrets typically have a surface area of about 20 $m^2/g$. Representative fibrets useful as the high surface area materials herein are available from Hoechst Celanese Corp. (Charlotte, N.C.) as cellulose acetate Fibrets®. For a detailed discussion of fibrets, including their physical properties and methods for their preparation, see "Cellulose Acetate Fibrets: A Fibrillated Pulp With High Surface Area", Smith, J. E., *Tappi Journal*, December 1988, p. 237; and U.S. Pat. No. 5,486,410 (Groeger et al.) issued Jan. 23, 1996; the disclosure of each of which is incorporated by reference herein.

In addition to these fibers, the skilled artisan will recognize that other fibers well known in the absorbency art may be modified to provide high surface area fibers for use herein. Representative fibers that may be modified to achieve high surface areas required by the present invention are disclosed in U.S. Pat. No. 5,599,335, supra (see especially columns 21-24), incorporated herein by reference.

Regardless of the nature of the high surface area fibers utilized, the fibers and the osmotic absorbent will be discrete materials prior to combination. As used herein, the term "discrete" means that the high surface area fibers and the osmotic absorbents are each formed prior to being combined to form the core of the separation apparatus or vessel. In other words, the high surface area fibers are not formed subsequent to mixing with the osmotic absorbent (e.g., hydrogel-forming absorbent polymer), nor is the osmotic absorbent formed after combination with the high surface area fibers. Combining of the discrete respective components ensures that the high surface area fibers will have the desired morphology and, more importantly, the desired surface area.

Spacers

Spacer materials may be used in the absorbent materials of the present invention. Spacer materials suitable for use in the present invention include any fibrous or particulate material that is, at most, only slightly soluble in water and/or lipophilic fluid. The spacer can be dispersed throughout a matrix of absorbent material in order to improve its permeability above that of a matrix made up of an absorbent material alone; or, the spacer can be used to maintain permeability even after the absorbent material swells and/or gels upon exposure to water. Therefore, the spacer helps reduce the pressure drop across an absorbent material matrix when a water-bearing fluid is passed through the matrix. In addition, if the absorbent material is prone to congealing after exposure to water and subsequent collapse, the spacer can aid in the reduction or prevention of gel congealing upon collapse.

Non-limiting examples of suitable spacer materials include sand, silica, aluminosilicates, glass microspheres, clay, layered silicates, wood, natural textile materials, synthetic textile materials, alumina, aluminum oxide, aluminum silicate, zinc oxide, molecular sieves, zeolites, activated carbon, diatomaceous earth, hydrated silica, mica, microcrystalline cellulose, montmorillonite, peach pit powder, pecan shell powder, talc, tin oxide, titanium dioxide, walnut shell powder, and particles of different metals or metal alloys. Also useful are particles made from mixed polymers (e.g., copolymers, terpolymers, etc.), such as polyethylene/polypropylene copolymer, polyethylene/propylene/isobutylene copolymer, polyethylene/styrene copolymer, and the like.

Other particulate materials useful herein are the synthetic polymeric particles selected from the group consisting of polybutylene, polyethylene, polyisobutylene, polymethylstyrene, polypropylene, polystyrene, polyurethane, nylon, teflon, and mixtures thereof. Of these, the most preferred are polyethylene and polypropylene particles, with the oxidized versions of these materials being especially preferred. Examples of commercially available particles useful herein include the ACumist™ micronized polyethylene waxes available from Allied Signal (Morristown, N.J.) available as the A, B, C, and D series in a variety of average particle sizes ranging from 5 microns to 60 microns. Preferred are the ACumist™ A-25, A-30, and A-45 oxidized polyethylene particles having a means particle size of 25, 30, and 45 microns, respectively. Examples of commercially available polypropylene particles include the Propyltex series available from Micro Powders (Dartek) and ACuscrub™ 51, available from Allied Signal (Morristown, N.J.) having a mean particle size of about 125 microns.

Absorbent Matrix

In order to increase the "dry" absorbent matrix permeability or maintain the permeability of the absorbent matrix when it is wet, it is important to provide a sufficient absorbent material to spacer, and, optionally, high surface area material ratio. Since the weight of possible spacers can vary greatly with respect to the weight of the absorbent material, the proportion must be quantified on a "dry" volumetric basis. "Net matrix volume" is the volume of the absorbent materials, spacers, and, optionally, any high surface area materials not including any inter-material volume the materials themselves may contain or any volume attributable to intra-material void spaces. "Intra-material void volume" is the cumulative volume of voids between material particles and/or fibers that typically and naturally occurs when particles and/or fibers occupy a given space. "Dry bulk matrix volume" is equal to the net matrix volume combined with the intra-material void volume on a dry basis. With respect to the present invention, it is preferred that the absorbent material is from 50 to 100%, more preferably from 75 to 95%, of the dry bulk matrix volume. It is preferred that the spacer is from 1 to 50%, more preferably from 5 to 25%, of the dry bulk matrix volume. It is preferred that the optional high surface area material be from 1 to 50%, more preferably from 5 to 25%, of the dry bulk matrix volume.

The gel materials, spacers, and, optionally, the high surface area materials can be formed into fibrous structures, woven or non-woven, such as sheets or films or membranes and configured in different ways. The sheet configuration is application-dependent and generally includes four generic configurations, namely, tubes, hollow fibers, plate and frame units, and spiral wound modules, all of which are within the scope of the present invention.

The loading density of water absorbing agent on such fibrous structures of the present invention may be in the range of from about 50 g of agent/m2 of fibrous structure to about 2000 g of agent/m2 of fibrous structure.

Tubes are, perhaps, the simplest configuration, in which the sheet is cast on the inside wall of a porous support tube. The tube configuration, however, can be cost-prohibitive with the porous support tube itself being the dominant cost factor.

Hollow fibers are, in theory, the ideal sheet configuration in that there is no "parasite" drag and no expensive porous support tube. Such fibers can be pressurized on the inside permitting "thin channel" fluid management of the water-bearing fluid. However, the biggest disadvantage of hollow fibers is the pressure constraint, which limits the cross-flow velocity down the lumen of the fiber. In addition, the hollow fiber configuration is more susceptible to fouling and plugging than the other three configurations; however, larger diameter fibers are becoming popular to improve fouling resistance. Fortunately, hollow fibers can be readily cleaned by back washing, which tends to compensate for their propensity to foul. In contrast, it is not recommended that tubes; plate and frame units; and spiral wound modules be back-washed, due to problems with membrane delamination and glue line seal rupture.

Flat sheets in a plate and frame unit offer the greatest versatility; they are also the most cost-prohibitive.

While spiral wound modules were originally developed for reverse osmosis; they are capturing an increased share of the ultrafiltration market by providing one of the least expensive ultrafiltration modules available in terms of cost per sheet area unit. Spiral wound units cannot be unwrapped for cleaning and most cannot be autoclaved. In terms of propensity to fouling, they are between hollow fibers and tubes (as well as the pricier plate and frame units).

The gel material can also be directly deposited onto a fibrous structure or a spacer material. This can be achieved by first applying the aqueous solution of a monomer containing from 10 to 100% of a water-soluble unsaturated monomer onto a fibrous structure or a spacer material and then polymerizing said monomer.

The thickness of the fibrous structure is generally in the range of from 0.01 to 10 mm, preferably 0.1 to 5 mm. The non-woven fabric is desired to have a basis weight in the range of from 5 to 1000 g/sq. m, preferably from 10 to 300 g/sq. m.

Particulate Filter

A particulate filter may also be incorporated into the system of the present invention. The particulate filter typically comprises a porous agent. Suitable porous agents for use in the present invention include any fibrous material capable of removing particulate matter. If filtration is carried out, it is desirable to pass the lipophilic fluid and water emulsion through a particulate matter filter such that particles and particle aggregates about 25 micron or larger are removed, preferably such that particles and particle aggregates about 15 microns or larger are removed, more preferably such that particles and particle aggregates about 10 microns or larger are removed, even preferably such that particles and particle aggregates about 5 microns or larger are removed, even more preferably such that particles and particle aggregates about 1 microns or larger are removed.

Hydrotropes

Suitable hydrotropes for use in the processes of the present invention are insoluble in lipophilic fluids, more desirably, they are water-soluble. A preferred hydrotrope is a short chain, low ethoxylated nonionic such as Dehydol™.

Conventional hydrotropes such as sodium, or calcium cumene sulfonate, potassium napthalenesulfonate are suitable for use in the present invention.

Additional nonlimiting examples of suitable hydrotropes include hydrotropes in which two polar groups are separated from each other by at least 5, preferably 6, aliphatic carbon atoms. Examples of suitable polar groups for inclusion in the hydrotrope include are hydroxyl and carboxyl ions. Particularly preferred hydrotropes are selected from the group consisting of:

1,4 Cyclo Hexane Di Methanol:

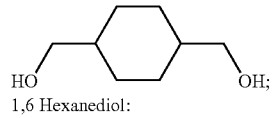

1,6 Hexanediol:

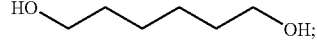

1,7 Heptanediol:

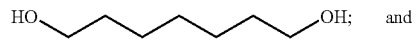 and mixtures thereof.

Mixtures of these organic molecules or any number of hydrotropes molecules which consist of two polar groups separated from each other by at least 5, preferably 6, aliphatic carbon atoms are also acceptable. 1,4 Cyclo Hexane Di Methanol may be present in either its cis configuration, its trans configuration or a mixture of both configurations.

Other materials that may be used as hydrotropes within the present invention include but are not limited to non-surfactant, non-aqueous organic solvents.

The liquid phase of the detergent compositions herein may also comprise one or more non-surfactant, non-aqueous organic solvents. The detergent compositions of the present invention will contain from about 15% to about 95%, more preferably from about 30% to about 70%, most preferably from about 40% to about 60% of an organic solvent. Such non-surfactant non-aqueous liquids are preferably those of low polarity. For purposes of this invention, "low-polarity" liquids are those which have little, if any, tendency to dissolve one of the preferred types of particulate material used in the compositions herein, i.e., the peroxygen bleaching agents, sodium perborate or sodium percarbonate. Thus relatively polar solvents such as ethanol are preferably not utilized. Suitable types of low-polarity solvents useful in the non-aqueous liquid detergent compositions herein do include non-vicinal $C_4$-$C_8$ alkylene glycols, alkylene glycol mono lower alkyl ethers, lower molecular weight polyethylene glycols, lower molecular weight methyl esters and amides, and the like.

A preferred type of non-aqueous, low-polarity solvent for use in the compositions herein comprises the non-vicinal $C_4$-$C_8$ branched or straight chain alkylene glycols. Materials of this type include hexylene glycol (4-methyl-2,4-pentanediol), 1,6-hexanediol, 1,3-butylene glycol and 1,4-butylene glycol. Hexylene glycol is the most preferred.

Another preferred type of non-aqueous, low-polarity solvent for use herein comprises the mono-, di-, tri-, or tetra-$C_2$-$C_3$ alkylene glycol mono $C_2$-$C_6$ alkyl ethers. The specific examples of such compounds include diethylene glycol monobutyl ether, tetraethylene glycol monobutyl ether, dipropolyene glycol monoethyl ether, and dipropylene glycol monobutyl ether. Diethylene glycol monobutyl ether, dipropylene glycol monobutyl ether and butoxy-propoxypropanol (BPP) are especially preferred. Compounds of the type have been commercially marketed under the tradenames Dowanol®, Carbitol®, and Cellosolve®.

Another preferred type of non-aqueous, low-polarity organic solvent useful herein comprises the lower molecular weight polyethylene glycols (PEGs). Such materials are those having molecular weights of at least about 150. PEGs of molecular weight ranging from about 200 to 600 are most preferred.

Yet another preferred type of non-polar, non-aqueous solvent comprises lower molecular weight methyl esters. Such materials are those of the general formula: $R^1$—C(O)—$OCH_3$ wherein $R^1$ ranges from 1 to about 18. Examples of suitable lower molecular weight methyl esters include methyl acetate, methyl propionate, methyl octanoate, and methyl dodecanoate.

The non-aqueous, generally low-polarity, non-surfactant organic solvent(s) employed should, of course, be compatible and non-reactive with other composition components, e.g., bleach and/or activators, used in the liquid detergent compositions herein. Such a solvent component is preferably utilized in an amount of from about 1% to 70% by weight of the liquid phase. More preferably, a non-aqueous, low-polarity, non-surfactant solvent will comprise from about 10% to 60% by weight of a structured liquid phase, most preferably from about 20% to 50% by weight, of a structured liquid phase of the composition. Utilization of non-surfactant solvent in these concentrations in the liquid phase corresponds to a non-surfactant solvent concentration in the total composition of from about 1% to 50% by weight, more preferably from about 5% to 40% by weight, and most preferably from about 10% to 30% by weight, of the composition.

Suitable types of non-aqueous surfactant liquids which can be herein include the alkoxylated alcohols, ethylene oxide (EO)-propylene oxide (PO) block polymers, polyhydroxy fatty acid amides, alkylpolysaccharides, and the like.

Alcohol alkoxylates are materials which correspond to the general formula:

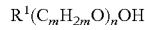

$R^1(C_mH_{2m}O)_nOH$ wherein $R^1$ is a $C_8$-$C_{16}$ alkyl group, m is from 2 to 4, and n ranges from about 2 to 12, preferably from about 2 to about 8. Preferably $R^1$ is an alkyl group, which may be primary or secondary, that contains from about 9 to 15 carbon atoms, more preferably from about 10 to 14 carbon atoms. Preferably also the alkoxylated fatty alcohols will be ethoxylated materials that contain from about 2 to 12 ethylene oxide moieties per molecule, more preferably from about 3 to 10 ethylene oxide moieties per molecule.

The alkoxylated fatty alcohol materials useful in the liquid phase will frequently have a hydrophilic-lipophilic balance (HLB) which ranges from about 3 to 17. More preferably, the HLB of this material will range from about 6 to 15, most preferably from about 8 to 15.

Examples of fatty alcohol alkoxylates useful in or as the non-aqueous liquid phase of the compositions herein will include those which are made from alcohols of 12 to 15 carbon atoms and which contain about 7 moles of ethylene oxide. Such materials have been commercially marketed under the trade names Neodol 25-7 and Neodol 23-6.5 by Shell Chemical Company. Other useful Neodols include Neodol 1-5, an ethoxylated fatty alcohol averaging 11 carbon atoms in its alkyl chain with about 5 moles of ethylene oxide; Neodol® 23-9, an ethoxylated primary $C_{12}$-$C_{13}$ alcohol having about 9 moles of ethylene oxide and Neodol® 91-10, an ethoxylated $C_9$-$C_{11}$ primary alcohol having about 10 moles of ethylene oxide. Alcohol ethoxylates of this type have also been marketed by Shell Chemical Company under the Dobanol tradename. Dobanol® 91-5 is an ethoxylated $C_9$-$C_{11}$ fatty alcohol with an average of 5 moles ethylene oxide and Dobanol 25-7 is an ethoxylated $C_{12}$-$C_{15}$ fatty alcohol with an average of 7 moles of ethylene oxide per mole of fatty alcohol.

Other examples of suitable ethoxylated alcohols include Tergitol® 15-S-7 and Tergitol® 15-S-9 both of which are linear secondary alcohol ethoxylates that have been commercially marketed by Union Carbide Corporation. The former is a mixed ethoxylation product of $C_{11}$ to $C_{15}$ linear secondary alkanol with 7 moles of ethylene oxide and the latter is a similar product but with 9 moles of ethylene oxide being reacted.

Other types of alcohol ethoxylates useful in the present compositions are higher molecular weight nonionics, such as Neodol® 45-11, which are similar ethylene oxide condensation products of higher fatty alcohols, with the higher fatty alcohol being of 14-15 carbon atoms and the number of ethylene oxide groups per mole being about 11. Such products have also been commercially marketed by Shell Chemical Company.

If alcohol alkoxylate nonionic surfactant is utilized as part of the non-aqueous liquid phase in the detergent compositions herein, it will preferably be present to the extent of from about 1% to 60% of the composition structured liquid phase. More preferably, the alcohol alkoxylate component will comprise about 5% to 40% of the structured liquid phase. Most preferably, an alcohol alkoxylate component will comprise from about 5% to 35% of the detergent composition structured liquid phase. Utilization of alcohol alkoxylate in these concentrations in the liquid phase corresponds to an alcohol alkoxylate concentration in the total composition of from about 1% to 60% by weight, more preferably from about 2% to 40% by weight, and most preferably from about 5% to 25% by weight, of the composition.

Another type of non-aqueous surfactant liquid which may be utilized in this invention are the ethylene oxide (EO)—propylene oxide (PO) block polymers. Materials of this type are well known nonionic surfactants which have been marketed under the tradename Pluronic. These materials are formed by adding blocks of ethylene oxide moieties to the ends of polypropylene glycol chains to adjust the surface active properties of the resulting block polymers. EO-PO block polymer nonionics of this type are described in greater detail in Davidsohn and Milwidsky; *Synthetic Detergents*, 7th Ed.; Longman Scientific and Technical (1987) at pp. 34-36 and pp. 189-191 and in U.S. Pat. Nos. 2,674,619 and 2,677,700. All of these publications are incorporated herein by reference. These Pluronic type nonionic surfactants are also believed to function as effective suspending agents for the particulate material which is dispersed in the liquid phase of the detergent compositions herein.

Another possible type of non-aqueous surfactant liquid useful in the compositions herein comprises polyhydroxy fatty acid amide surfactants. Materials of this type of non-ionic surfactant are those which conform to the formula:

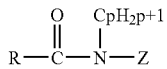

wherein R is a $C_{9-17}$ alkyl or alkenyl, p is from 1 to 6, and Z is glycityl derived from a reduced sugar or alkoxylated derivative thereof. Such materials include the $C_{12}$-$C_{18}$ N-methyl glucamides. Examples are N-methyl N-1-deoxyglucityl cocoamide and N-methyl N-1-deoxyglucityl oleamide. Processes for making polyhydroxy fatty acid, amides are know and can be found, for example, in Wilson, U.S. Pat. No. 2,965,576 and Schwartz, U.S. Pat. No. 2,703,798, the disclosures of which are incorporated herein by reference. The materials themselves and their preparation are also described in greater detail in Honsa, U.S. Pat. No. 5,174,937, Issued Dec. 26, 1992, which patent is also incorporated herein by reference.

Combined Condenser-Coalescer

In some drying processes, vapor of several gasses can be generated. When these vapors are condensed out of the air, they may form an emulsion of the two pure liquids. Separation of the two liquids can be accomplished with a coalescer resulting in two predominantly pure liquids. For example, when warm air is used to dry clothes containing water and a volatile solvent, the combination condenser-coalescer facilitates the condensation and separation of the water vapor and solvent vapor. An activated carbon filter can also be added to the system to clean air in the drying loop after the drying cycle is complete.

Air containing water vapor and solvent vapor from a drying process is exposed to a condenser. Condensate is exposed to a coalescer where it is separated into its pure components. Air leaving the condenser is heated and reintroduced to the dryer using a blower. A preferred condenser is a compact liquid-to-air heat exchangers such as manufactured by Thermatron Engineering Inc.

The coalescer can work continuously with the drying process or in a batch process. Energy for the heater and condenser can be provided from a single device like a heat pump or from separate devices like re-circulating heaters and re-circulating chillers. The heat exchangers, condenser and heater, can be direct or indirect type. A preferred coalescer is the AquaSep and PhaseSep liquid/liquid coalescers from Pall Corporation.

Processes of the Invention

The laundry process for cleaning fabric articles according to the present invention requires the cleaning composition and the automatic laundry machine to cooperate to maximize the cleaning effect of the laundry system. Such process in one aspect comprises contacting a fabric article in need of cleaning with a cleaning composition wash medium containing lipophilic fluid and one or more laundry additives selected from the group consisting of surfactants, antistatic agents, and mixtures thereof in an automatic laundry machine equipped with a filter for removing contaminants (e.g., soils, particulate materials removes from the fabric, dyes released from the fabric) present in the lipophilic fluid as a result of the contacting the cleaning composition with the fabric articles being cleaned. This filter is specially designed such that it does not remove more than about 50% (preferably less than about 10%) per cycle through this filter of the laundry additives from the lipophilic fluid. In this system at least a portion of the cleaning composition cycled through this filter is sent back into contact with the fabric articles being cleaned.

The present invention laundry process in another aspect comprises contacting a fabric article in need of cleaning with a cleaning composition wash medium containing lipophilic fluid and one or more laundry additives in an automatic laundry machine equipped with a filter for removing at least some of the laundry additives prior to rinsing the fabric with the lipophilic fluid used to clean the fabric articles. This filter is specially designed to remove more than 75% (preferably more than 90%) per cycle through this filter of the laundry additives from the lipophilic fluid. During this process at least a portion of the cleaning composition wash medium cycled through this filter is recontacted with the fabric articles to be cleaned, providing a rinse step to the process without having to draw on a reserve of clean lipophilic fluid.

The present invention laundry process for cleaning fabric articles also includes the following. This process comprises:

a. contacting a fabric article in need of cleaning with a wash medium containing lipophilic fluid and one or more laundry additives selected from the group consisting of surfactants, antistatic agents, and mixtures thereof in an automatic laundry machine equipped with a filter for removing contaminants present in the lipophilic fluid as a result of the contacting the cleaning composition with the fabric articles being cleaned and a filter for removing at least some of the laundry additives prior to rinsing the fabric articles with the lipophilic fluid used to clean the fabric articles;

b. filtering at least a portion of the wash medium through the filter for removing contaminants present in the lipophilic fluid as a result of the contacting the cleaning composition with the fabric articles being cleaned, said filter further characterized in that it does not remove more than 50% per cycle through the filter of the laundry additives from the lipophilic fluid;

c. recontacting the fabric articles to be cleaned during the laundry process with at least a portion of the cleaning composition filtered through the filter for removing contaminants from step (b);

d. filtering at least a portion of the wash medium through the filter for removing at least some of the laundry additives prior to rinsing the fabric with the lipophilic fluid used to clean the fabric articles, said filter further characterized in that it removes more than 75% per cycle through the filter of the laundry additives from the lipophilic fluid; and e. recontacting the fabric articles to be cleaned during the laundry process with at least a portion of the wash medium filtered through the filter for removing laundry additives from step (d).

The present invention process typically also includes some or all of the following process components. Detergent (or other products) comprising one or more laundry additives is added to lipophilic fluid either before or after wash fluid contacts fabric articles in need of cleaning in an automatic washing machine. After the wash cycle, in order to recover the lipophilic fluid for future laundry processes, fluid is drained from drum of the machine and one or more of the laundry additives are separated from lipophilic fluid. Preferred mode of separation is extraction of additives into a water phase that is introduced during the process of purifying the lipophilic fluid for reuse by the machine. As such water can be added during to separation step to enhance the extraction of additives and other contaminants. Together with the water one can add "extraction aids" such as hydrotopes and emulsifiers. Preferred hydrotope is a short chain, low ethoxylated nonionic such as Dehydol™. Other modes of separation are filtration, coalescence, adsorption, centrifugation, and distillation. Removal of laundry additives is such that the lipophilic fluid is sufficiently clean of laundry additives and soil contaminants that it is ready for use with next load of fabric to be cleaned, and the water phase containing laundry additives (and likely also some of the soil removed from the fabrics) is substantially free of lipophilic fluid (preferably this water phase contains laundry additives safe for disposal down the drain). In one aspect of the present invention, the cleaning composition fluid is filtered through a filter which selectively removes some but not all of the laundry additives, thereby allowing the reuse of these laundry additives with the next load of fabric articles to be cleaned.

An automatic washing machine useful according to the present invention is any machine designed to clean fabrics with a wash medium containing lipophilic fluid and laundry additives. While the machine will typically have a rotating drum capable of contacting the lipophilic fluid and laundry additives with the fabrics to be cleaned, for purposes of this invention any method for contacting the lipophilic fluid and laundry additives with the fabric is envisioned, obviously as long as such contact permits the cleaning process to occur. Such machines must comprise a connection for supplying lipophilic fluid (alone or with laundry additives already mixed therewith) into a chamber for contacting the fabric articles to be cleaned with the lipophilic fluid. Preferred machines also comprise a storage chamber for storing the lipophilic fluid to be supplied to the wash process carried out in the machine. Thus, these machines typically have a source of lipophilic fluid. The machines may also comprise additional separation system(s) capable of separating the lipophilic fluid from laundry additives after the fabric cleaning process in order to reuse the lipophilic fluid. Further the present invention machines comprise a connection for attachment to an aqueous waste removal system such that at least some (preferably all) of the laundry additives removed by the separation system are disposed of down the drain. Preferred machines also have a connection for attachment to a source of water, typically tap water.

"Substantially free of lipophilic fluid", as used herein, means that the aqueous mixture to be disposed of down the drain does not contain unacceptably high levels of lipophilic fluid as determined by both environmental safety and cost of replacement of the lost lipophilic fluid from the washing machine store of lipophilic fluid. Since it is highly desirable that essentially all the lipophilic fluid be reused in the current wash system, it is highly desirable that very little if any of the lipophilic fluid is disposed of down the drain with the above-noted aqueous phase containing laundry additives.

"Down the drain", as used herein, means both the conventional in-home disposal of materials into the municipal water waste removal systems such as by sewer systems or via site specific systems such as septic systems, as well as for commercial applications the removal to on-site water treatment systems or some other centralized containment means for collecting contaminated water from the facility.

The present invention is also directed to a process for removing water from a lipophilic fluid and water emulsion. The process includes exposing the emulsion to an absorbent material, as discussed in detail above, in order to effect the removal of the water from the lipophilic fluid and water emulsion. The lipophilic fluid is recovered and termed "lipophilic fluid." Within this process, it is possible to add the optional initial steps of exposing a fabric to lipophilic fluid and water and then recovering the lipophilic fluid and water in the form of the lipophilic fluid and water emulsion.

Although not required, it is also possible to pass the lipophilic fluid and water emulsion through a particulate matter filter such that particles and particle aggregates about 1 micron or larger are removed, preferably such that particles and particle aggregates about 5 microns or larger are removed, more preferably such that particles and particle aggregates about 10 microns or larger are removed, even more preferably such that particles and particle aggregates about 15 microns or larger are removed, even more preferably such that particles and particle aggregates about 25 microns or larger are removed. It is further possible to add to the process the step of exposing the lipophilic fluid and water emulsion to activated carbon prior to exposure to the absorbent material.

As previously discussed, the absorbent material may comprise surface cross-linked polymers, surface cross-linked polyacrylates, surface cross-linked polyacrylamides, or combinations of these absorbent materials. Further, any of the absorbent materials may have a fibrous morphology, a particulate morphology, or mixtures of any of the absorbent materials with similar or different morphologies. The absorbent material may take several forms, including but not limited to, a porous woven sheet impregnated with absorbent materials, a film, or a membrane.

In order to aid the absorption of water from and/or separation of the lipophilic fluid and water emulsion, it may be desirable to increase the temperature of the emulsion prior to exposing the emulsion to the absorbent material. If the emulsion is preheated, it is preferable to heat it by at least about 10° C. Preferably however, the temperature of the lipophilic fluid and water emulsion is at most about 50° C. prior to exposing the emulsion to absorbent material since some absorbent materials cannot absorb water at higher temperatures, particularly when temperature increase is one of their trigger or collapse mechanisms. Aside from heating the emulsion in order to aid the absorption of water from and/or separation of the lipophilic fluid and water emulsion, it may be additionally or alternatively desirable to cool the emulsion, and/or add demulsifying agents to the emulsion in order to aid the absorption of water from and/or separation of the lipophilic fluid and water emulsion.

Once the absorbent material has absorbed at least a portion of the water removed from the lipophilic fluid and water emulsion, it is desirable to trigger the absorbent material to release the removed water by exposing the absorbent material to a trigger mechanism including, but not limited to, light, pH, temperature, sound, electric field, pressure, ionic strength, vibration, and combinations of these trigger mechanisms. Absorbent material "trigger" or "collapse" mechanisms and methods for their introduction are well known in the absorbent material arts.

Once the emulsion is separated, the collected lipophilic fluid can be exposed to activated carbon in order to further facilitate its purification and recycling into the system. Further, the removed water may also be exposed to activated carbon prior to its disposal or recycling into the system. Methods to purify the collected or separated lipophilic fluid include well-known distillation processes, membrane filters, adsorption processes, absorption processes, extraction processes, ion exchange processes, air stripping processes, and chromatography.

The lipophilic fluid and water emulsion may also contain up to about 10% emulsifier by weight of the emulsion. If it does contain emulsifier, it is preferable for the lipophilic fluid and water emulsion to have a water/lipophilic fluid/emulsifier ratio of from about 1/98.9/0.1 to about 40/55/5 by weight of the emulsion. Further, as discussed in the "Adjunct Ingredients" section above, it is preferred that the emulsifier also contains a surfactant. Lastly, also as discussed in the aforementioned section, the lipophilic fluid and water emulsion may also contain adjunct ingredients selected from the group consisting of enzymes, bleaches, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures of these adjuncts.

In the present invention, it is preferred that the lipophilic fluid includes a linear siloxane, a cyclic siloxane, and mixtures of these siloxanes. It is more preferable that these siloxanes are selected from the group consisting of octamethylcyclotetrasiloxane, decamethylcyclopentasiloxane, dodecamethylcyclohexasiloxane, and mixtures of these siloxanes. It is even more preferred if the lipophilic fluid contains decamethylcyclopentasiloxane. Lastly, it is most preferred if the lipophilic fluid contains decamethylcyclopentasiloxane and is substantially free of octamethylcyclotetrasiloxane.

It was also surprisingly found that absorbent materials such as gels can effectively remove surfactants from the lipophilic fluid and water emulsion. The surfactant that are removed may include the following nonlimiting examples:
  a) Anionic surfactants (e.g., alkyl or aryl sulfates, aerosol derivatives, etc)
  b) Cationic or basic surfactants (e.g., quaternary surfactants, primary and secondary amines, etc.)
  c) or combinations of above.

To facilitate removal of other contaminants such as surfactants from the contaminant-containing lipophilic fluid, it is desirable to wet the adsorbent material with a wetting agent prior to the contaminant-containing lipophilic fluid contacting the adsorbent material. Typically, the wetting agent comprises a lipophilic fluid.

In one embodiment, a process for removing a contaminant from a contaminant-containing lipophilic fluid comprise the steps of:
  a. contacting an adsorbent material comprising a charged agent with the contaminant-containing lipophilic fluid to produce a first eluent; and
  b. optionally, contacting an adsorbent material comprising a polar agent and/or apolar agent with the first eluent to produce a second eluent; and
  c. optionally, repeating step a and/or step b, at least once; and
  d. optionally, recovering the second eluent.

The process may further comprise the step of:
  e. contacting a fabric with the second eluent.

Likewise, the process may further comprise the step of:
  f. contacting the adsorbent material comprising the charged agent with an environmental condition such that residual lipophilic fluid present on the charged agent is released. The environmental condition is typically selected from the group consisting of exposing the charged agent to heat, vacuum, application of a mechanical force and mixtures thereof.

The process may further comprise the step of:
  g. contacting the adsorbent material comprising the charged agent with a solvent such that the contaminant present on the charged agent is released. The contaminant may be discarded at this time. The solvent typically comprises a polar solvent having a pH of from about 2 to about 8 and/or an ionic strength of between about 0.01 to about 60. Nonlimiting examples of suitable solvents include water and/or alcohols.

The process may further comprise the step of:
  h. contacting the adsorbent material comprising the charged agent with an environmental condition such that residual solvent present on the charged agent is released. The environmental condition is typically selected from the group consisting of heat, vacuum, application of a mechanical force and mixtures thereof.

In another embodiment, a process for removing a contaminant from a contaminant-containing lipophilic fluid comprising the steps of:
  a. contacting an adsorbent material comprising a charged agent with the contaminant-containing lipophilic fluid to produce a first eluent; and
  b. contacting an adsorbent material comprising a polar agent and/or apolar agent with the first eluent to produce a second eluent; and
  c. recovering the second eluent;
  d. contacting a fabric with the second eluent;
  e. contacting the adsorbent material comprising the charged agent with an environmental condition such that residual lipophilic fluid present on the charged agent is released;
  d. contacting the adsorbent material comprising the charged agent with a solvent such that the contaminant present on the charged agent is released; and
  e. contacting the adsorbent material comprising the charged agent with an environmental condition such that residual solvent present on the charged agent is released; and
  h. optionally, repeating any of steps a-g at least once.

In yet another embodiment, a continuous filtering cycle wherein an adsorbent material comprising a charged agent is repeatedly contacted with a contaminant-containing lipophilic fluid such that the adsorbent material removes the contaminant from the lipophilic fluid, is provided. The charged agent present in the continuous filtering cycle may be exposed to an environmental condition such that the contaminant is released from the adsorbent material. Typically, the environmental condition in this embodiment comprises exposing the charged agent to acids, bases and/or salts.

In still another embodiment, a process for removing a contaminant from a lipophilic fluid comprising:
  a. contacting a charged agent having the formula:

wherein W is Si; Z is a charged substituent group selected from carboxylates, primary amines and mixtures thereof; and T is a counterion selected from alkaline, alkaline earth metals and mixtures thereof; and
  b. optionally, contacting a silica gel embedded in activated carbon in sheet form, such that the contaminant is removed from the lipophilic fluid, is provided.

The results of practicing the processes of the present invention result in a contaminant-containing adsorbent material being produced by the processes according to the present invention.

Lipophilic fluids resulting from the processes of the present invention are within the scope of the present invention Different techniques known to those skilled in the art for facilitating filtering of the lipophilic fluid may be used. For example, the contaminant-containing lipophilic fluid may contact the adsorbent material under vacuum.

Nonlimiting Example of the Processes of the Present Invention

FIG. 1 shows a process for purification of the solvent and regeneration of purification agents. The collected solvent 100 is first treated with a porous agent 101 that removes the non-dissolved contaminants out of the solvent. Such contaminants can be particles of dust, garment lint, skin flakes, and/or un-dissolved soils.

Then, water contaminant is removed 103 by a water absorbent agent. An example of such agent is a hydrogel polymer.

The further purification process contains a step of removing surfactant contaminants 105 with a charged agent. It was discovered that charged agents with pKa from about 2 to about 8 can reversibly remove surfactants. An example of a charged agent is ion exchange resin.

After the surfactant contaminants are removed, the solvent is exposed to an apolar agent that removes non-polar contaminants 107 such as oils. An example of such agent is activated carbon.

The polar solvent contaminants such as dyes are removed by a polar agent 109. An example of such agent is silica gel or diatomaceous earth materials.

The purified solvent that was exposed to all the above agents is collected 104.

All above agents can be dried and/or regenerated in the described process. For example, in order to safely dispose an agent or prior to agent regeneration after its use, it is preferred that an agent is free of the solvent. The agents can be dried by exposing them to heated air. After the solvent is evaporated in steps 110, 111, 112, 113, and 102, the solvent vapor is condensed 116. A water absorbing agent contains the solvent as well as water. Upon exposure to heated air, water is removed as water vapor and also condensed 116. water and solvent condensate can be separated by a solvent-water separator 117 to produce clean solvent 104 and water that can be collected 118 or drained.

Dried charged agent can be regenerated by exposing it to water with pH from 2 to 8 or with ionic strength from $pK_a$ or $pK_b$ of from about 2 to about 8. The water containing surfactant contaminant removed from a charged agent is collected 118 or can be drained. After the contact of a charged agent with water, the charged agent contains some residual water. Prior to exposure of the regenerated charged agent to the solvent, water is again removed by heated air 115, condensed 116, separated from solvent 117, and collected 118.

OVERALL PURIFICATION PROCESS a) Collect dirty solvent;
b) Contact with porous agent;
c) Contact with water absorbing agent;
d) Contact with charged agent;
e) Contact with apolar agent;
f) Contact with polar agent;
g) Collect purification solvent.

Process of regeneration of water absorbing agent:
a) Contact water absorbent agent with heat;
b) Remove water and residual solvent vapors;
c) Condense water and residual solvent vapors;
d) Separate water and residual solvent;

Process of regeneration of charged agent;
a) Contact charge agent with heat;
b) Remove residual solvent;
c) Condense residual solvent;
d) Collect residual solvent;
e) Contact charge agent with regeneration solvent;
f) Remove regeneration solvent with desorbed contaminants;
g) Contact charge agent with heat;
h) Remove water vapor;
i) Condense water vapor.

Figure 2:
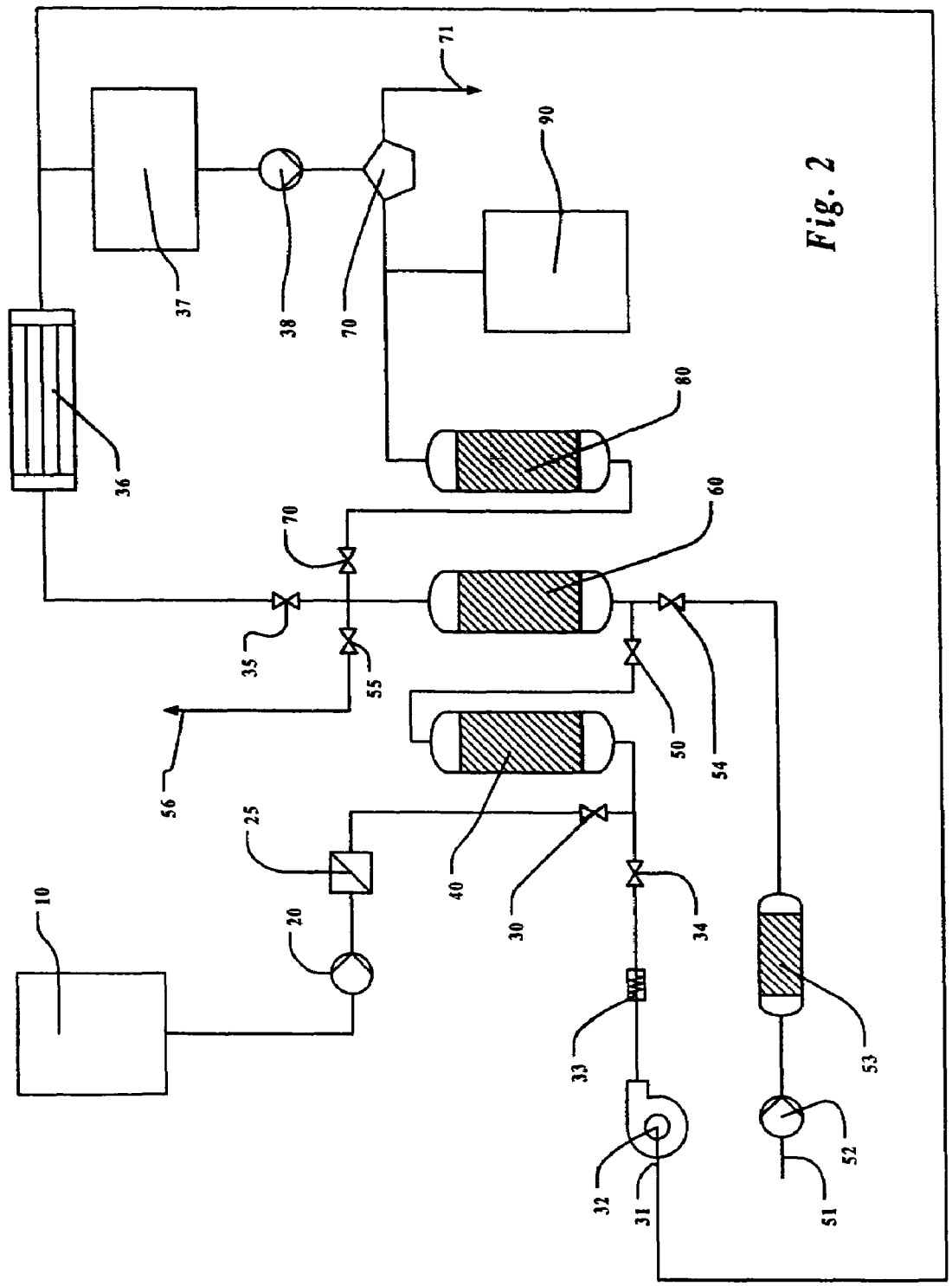
FIG. 2 is a schematic representation of one embodiment of a system for processing a lipophilic fluid in accordance with the present invention.

FIG. 2 shows detailed diagram of solvent purification and agent regeneration system.

The "dirty" dry cleaning fluid is collected in a collection tank 10. The fluid is pumped by a pump 20 thru a filter 25. The filter 25 removes most of un-dissolved contaminants such as lint, skin flakes, dust. The preferred filter rating is about 1 um.

After the filter 25, the fluid is passed thru a valve 30 and exposed to a de-watering filter 40. Filter 40 contain water absorbing material such as hydrogel that absorbs water out of the dry cleaning fluid. Some gels are found to also absorb ionic surfactants in the presence of water. The water absorbing material is distributed in a fiber body such as a porous cellulosic or glass wool web. The fiber body holds the water absorbing material in the filter 40 from being carried away by the fluid flow.

After water is removed by the de-watering filter 40, the fluid is passed thru a valve 50 to enter a surfactant adsorbent filter 60. The filter 60 contains an ion exchange adsorbent material as a packed bed or is imbedded into a fiber body. The surfactants and other ionic/polar species are adsorbed onto the ion exchange material. The preferred ion exchange material has pKa values from about 2 to about 8.

After the filter 60, the fluid that contains no water and no ionic species, is passed thru a valve 70 and into a filter 80. The filter 80 contains non-polar and polar adsorbent materials. Non-polar adsorbent material, e.g. activated carbon, adsorbs non-polar contaminants such as body/food soils. The polar adsorbent material, e.g. silica gel, removes polar contaminants such as dyes and fatty acids. The filter 80 also serves as a "back-up" for filter 60. If some amount of surfactants are passed thru the filter 60 without being adsorbed, the filter 80 adsorbs such surfactants. The purified solvent is collected in a recovery fluid tank 90.

The advantage of the filter 80 is that the combination of non-polar and polar adsorbents removes almost any dry cleaning contaminant. The disadvantage of such combination is that such adsorbents have limited adsorbent capacity and are difficult to regenerate. The largest contaminants in dry cleaning systems are surfactants. The amount of surfactants in the dry cleaning fluid can be as high as 1%, which would require large quantities of non-polar and polar materials to remove the surfactants. Therefore, this invention teaches use of filtration materials that can be easily regenerated.

The filter 40 is regenerated by passing air 31 by means of a blower 32. The air is heated by a heater 33 to a temperature of about 65° C. The heated air is then passed thru a valve 34 and directed into the filter. The filter 40 contains residual solvent trapped in the fiber body and water absorbed in the absorbent material. Exposure to the heated air evaporates both residual solvent and absorbed water.

The filter 60 contains the ion exchange adsorbent that is regenerated by contacting the adsorbent with a fluid with adjusted pH or ionic strengths. Such fluid can be water with a dissolved salt that is produced by pumping water 51 by a pump 52 thru a cartridge 53 that contains pH or ionic strengths adjusting agent. Prior to exposing of the filter 60 to pH adjusted water, the filter 60 must be dried to prevent cross-contamination of the solvent and water. It is preferred that water exiting the filter 60 has no solvent present. Therefore, heated air is directed thru the filter 60 to evaporate the residual solvent trapped in the adsorbent void spaces. Since both filters 40 and 60 are dried, this operation can be executed simultaneously. The air 31 is propelled by the blower 32 thru the heater 33, thru the valve 34, and thru the valve 50.

The air with solvent and water vapors exits thru a valve 35 and enters a condenser 36. In the condenser, solvent and water vapors are condensed as liquid and collected in a condensate tank 37. The air that passed thru the condenser 36 is recirculated back into the blower 32. In order to reuse the solvent, it has to be free of water. The coalescer 70 splits the condensate solvent/water mixture into the solvent stream and water stream 71. The preferred coalescer is a porous hydrophobic membrane that allows the solvent to penetrates thru the pores, but prevents water from penetrating the membrane. The condensate flow thru the coalescer 71 is maintained by a pump 38. The solvent stream is collected in a recovered fluid tank 90.

After the filter 60 is dry, the ion exchange adsorbent is regenerated by exposing it to a water that contain pH or ionic strengths adjusting agent. As water 51 is pumped by a pump 52 thru a cartridge 53, it dissolves some a predetermined portion of the adjusting agent and enters the filter 60 thru the valve 54. After passing the filter 60, the water containing the regenerated surfactant 55 is removed from the filter 60 thru valve 55.

By regenerating the filters of the present invention, multiple use of a filter can occur. This in turn greatly increases effective cumulative filter lifetime.

1)

Figure 3:
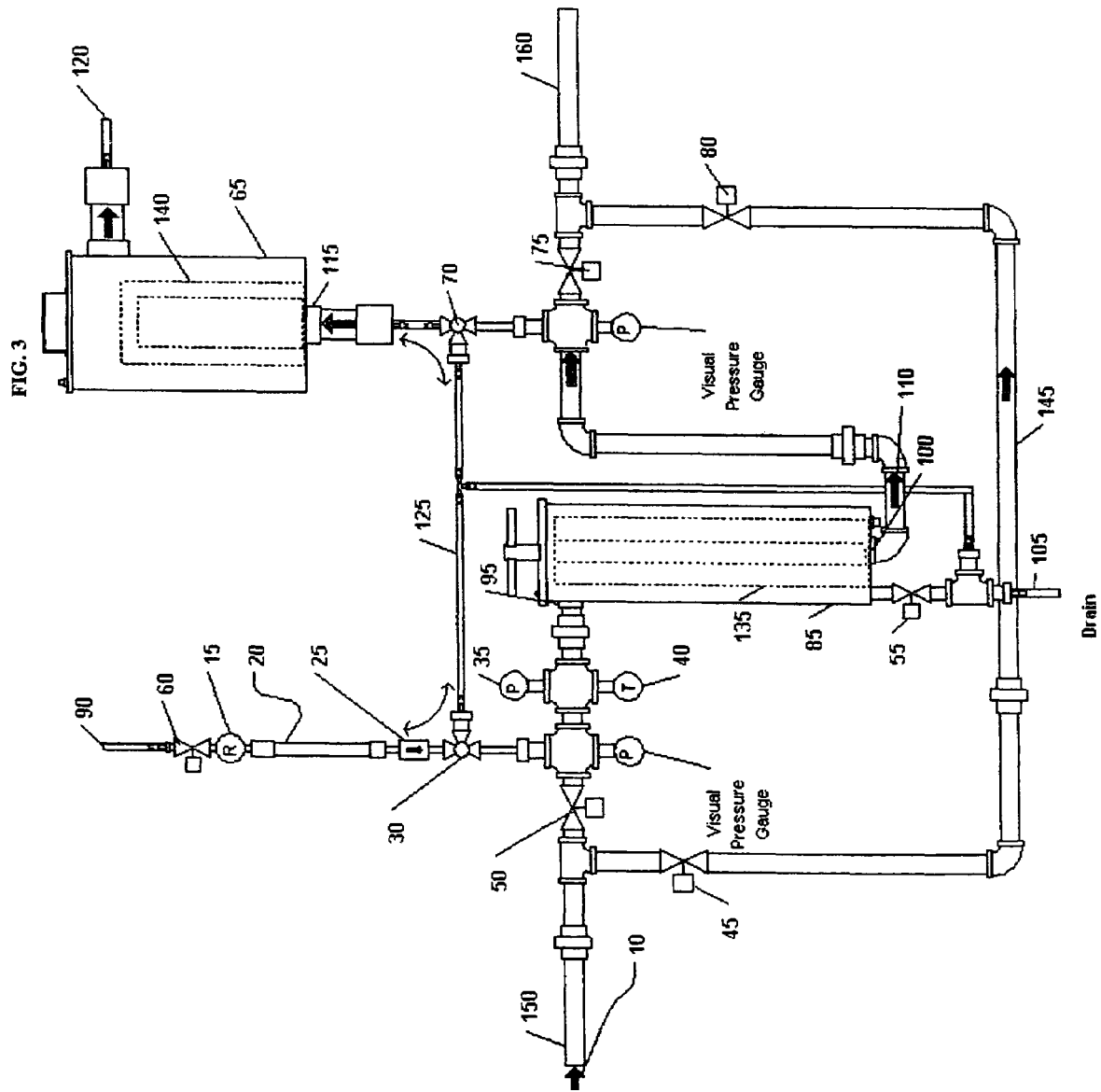
FIG. 3 is a schematic representation of another embodiment of a system for processing a lipophilic fluid in accordance with the present invention.

FIG. 3 illustrates a system that removes water from a lipophilic fluid and water emulsion by exposing the emulsion to gel and regenerates the absorbent material by exposing gel to heated air. Lipophilic fluid and water emulsion 10 flows through two-way valve 50 into the filter housing 85 thru the inlet 95. Fluid flows from the outside of the pleated filter 135 to the inside and water is absorbed by the absorbent material contained in the filter 135. The de-watered lipophilic fluid 110 is removed from the housing 85 thru the outlet 100 and two-way valve 75. The apparatus can be inserted into any process line 150 and 160.

As the water absorbent in the filter cartridge 135 swells from water absorption it causes a restriction in flow and a subsequent increase in inlet pressure. When the inlet pressure sensor 35 senses a predetermined pressure and a signal is sent to close valves 50 & 75 and open valves 45 & 80 thus bypassing the filter and avoiding excessive inlet pressure buildup and causing no interruption in process. An additional dewatering filter cartridge could potentially be inserted in the bypass line 145 while the system is in the bypass mode. An indicator (flashing light, audible or other obvious signal) is given off to indicate that the regeneration cycle needs to be started automatically or manually. When the regeneration cycle is started air 90 is pushed through, valve 60, regulator 15 to keep the air flow constant, into the filter housing 85 through inlet 95 and effectively forces the fluid out through valve 55 and drain line 105 into a working tank or other vessel. Draining is essential to recover the excess fluid and speed the drying process as will be described later.

After draining is complete valve 55 is closed and valve 70 is opened and compressed air and vapor are routed through valve 70 into mist eliminator housing 65 through the inlet 115, through a mist eliminating filter 140 where the vapor is condensed or fluid coalesced and the air pressure is vented through the outlet 120 to the atmosphere or into a condenser to reclaim any evaporated fluid. After a desired time (1-5 minutes) the heating element 20 is turned on as the air flow continues to make the same pass through the system. Heating is applied to the system for sufficient time to evaporate the majority of water from the absorbent polymer thus regenerating the filter. Drying time will be dependent on size of filter, amount of water, airflow and temperature. The 1 to 5 minute delay is a safety in case combustible lipophilic fluid may have entered the heater 20 in the event that 3-way valve 30 and 1-way check valve 25 leaked during the filtration process. The air temperature is controlled by sensor 40, which sends feedback to heater 20 to keep air at constant 60° C. A backup thermocouple sensor (not shown) is inserted inside heater 20 and will cut power to the heater should the surface temperature of the heater 20 rise above a desired set point (~50° C.). Heater 20 is also wired in series with valve 60 so heater will not operate unless valve 60 is also open (won't operate without air supply). Heater will also not operate if pressure sensor 35 is below a predetermined pressure; basically will not operate if there is no airflow in the system.

After the heating cycle, the heater is turned off but air continues to flow through the system for 1 minute as a cooling cycle. A cooling cycle is needed since the heating element 20 temperature will rise rapidly if the air supply is shut off even if the power to the heating element is also shut off. Valve 60 is then closed and excess air pressure is bled from the system through mist eliminator outlet 120 for 15 seconds. 3-way valves 30 and 70 are then closed (switch to a right angle position). Valves 45 and 80 close and valves 50 and 75 open and lipophilic fluid again flows through valve 50 into filter housing 85, through filter, through outlet 100, and through valve 75.

Fluid that condensed in mist eliminator housing 65 will now gravity drain through inlet 115, through valve 70, through drain line 125, and into the working tank or other vessel through drain line 105.

The system is operated by a PLC program that takes inputs from temperature and pressure sensors and sends outputs to air and electronically controlled valves and a heater to automatically control the process.

Figure 4:
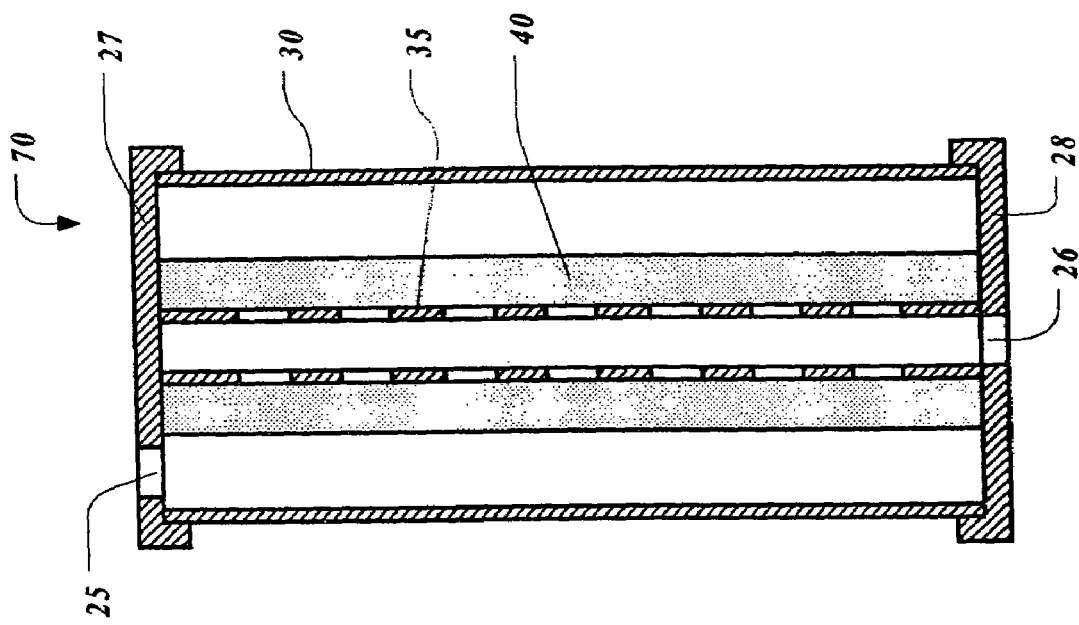
FIG. 4 is a schematic representation of an absorbent material filter in accordance with the present invention.

The emulsion de-watering filter 70 (see FIG. 4) contains an outer cylinder 30 sealed from both ends by discs 27 and 28. The disc 27 has an inlet opening 25 that accesses the inside of the outer cylinder 30. The disc 28 has an opening 28 that establishes communication with perforated inner cylinder 35. Emulsion de-watering media 40 forms a barrier between the inside of outer cylinder 30 and inner cylinder 35. The emulsion de-watering media 40 consists of a fiber material used to support absorbent polymer particles. Gel particles are uniformly distributed through out the fiber material.

In one embodiment, fiber material can be used to provide a support structure for polymer particles and provide sufficient void space between polymer particles. The void space allows particles to swell upon exposure to water without restricting the flow of the emulsion.

Suitable types of super absorbent polymers include, but are not limited to, polyacrylate, polyacrylamide, cellulose ethers.

Suitable types of fiber material include, but are not limited to, cellulosic, glass wool, activated carbon clothes.

Suitable types of heated gas include, but are not limited to, air and nitrogen.

Suitable types of filter design include, but are not limited to, cylindrical, packed bed, fluidized bed.

With reference to FIG. 3, the heated gas path is through the filter media (same as emulsion), along the filter media (low gas flow pressure drop).

Even though reference is made to fabric article treating systems, the systems and processes of the present invention may be employed in other filter-based systems, such as fuel de-watering, oil/water emulsion de-watering, regeneration of used fuel filters, and drying of any kind of filter.

What is claimed is:

1. A process for purifying a contaminant-containing lipophilic fluid comprising undissolved contaminants, water and surfactant contaminants, and contaminants selected from the group consisting of non-polar body soil or food soil contaminants and polar dye or fatty acid contaminants in a fabric treating system comprising the steps of:
   a. filtering said contaminant-containing fluid to remove said undissolved contaminants;
   b. contacting said contaminant-containing lipophilic fluid from step (a) with a water absorbing material to remove said water;
   c. contacting the lipophilic fluid from step (b) with an ion-exchange material to remove said surfactant; and
   d. contacting the lipophilic fluid from step (c) with non-polar and polar absorbent materials to remove said non-polar and polar contaminants.

2. The process according to claim 1 wherein the water absorbing material comprises a hydrogel.

3. The process according to claim 2 wherein the water absorbing material is regenerated after absorbing water.

4. The process according to claim 1 wherein the ion-exchange material used in step (c) is regenerated after contacting the lipophilic fluid.

* * * * *

UNITED STATES PATENT AND TRADEMARK OFFICE
CERTIFICATE OF CORRECTION

PATENT NO. : 7,241,728 B2  
APPLICATION NO. : 11/452849  
DATED : July 10, 2007  
INVENTOR(S) : Arseni Valerevich Radomyselski et al.

Page 1 of 1

It is certified that error appears in the above-identified patent and that said Letters Patent is hereby corrected as shown below:

Title Page  
Add to References Cited, U.S. PATENT DOCUMENTS,  
-- 6,955,183 B2  2/2005 Ehmsperger et al.--.  
Column 1  
Line 11, delete "60/318/648" and insert -- 60/318,648 --.  
Column 11  
Line 13, delete "Coming" and insert -- Corning --.  
Column 12  
Line 9, delete "$f_H 0.10$" and insert -- $f_H > 0.10$ --.

Signed and Sealed this

Twenty-seventh Day of November, 2007

JON W. DUDAS  
*Director of the United States Patent and Trademark Office*